(12) United States Patent
Koseoglu et al.

(10) Patent No.: US 12,533,664 B2
(45) Date of Patent: Jan. 27, 2026

(54) TYPE II HYDROTREATING CATALYST FOR HYDROCARBON OIL AND METHOD FOR HYDROTREATING HYDROCARBON OIL

(71) Applicants: Saudi Arabian Oil Company, Dhahran (SA); JGC Catalysts & Chemicals Ltd., Kawasaki Kanagawa (JP); Japan Cooperation Center for Petroleum and Sustainable Energy, Tokyo (JP)

(72) Inventors: Omer Refa Koseoglu, Dhahran (SA); Ali Alzaid, Dhahran (SA); Kazuki Nakajima, Kawasaki (JP); Koji Uchida, Kawasaki (JP); Yusuke Matsumoto, Kawasaki (JP)

(73) Assignees: Saudi Arabian Oil Company, Dhahran (SA); JGC Catalyst & Chemicals Ltd, Kawasaki Kanagawa (JP); Japan Cooperation Center for Petroleum and Sustainable Energy, Tokyo (JP)

( * ) Notice: Subject to any disclaimer, the term of this patent is extended or adjusted under 35 U.S.C. 154(b) by 0 days.

(21) Appl. No.: 18/067,829

(22) Filed: Dec. 19, 2022

(65) Prior Publication Data
US 2024/0198319 A1    Jun. 20, 2024

(51) Int. Cl.
*B01J 29/16*    (2006.01)
*B01J 23/882*    (2006.01)
(Continued)

(52) U.S. Cl.
CPC .......... *B01J 29/166* (2013.01); *B01J 23/882* (2013.01); *B01J 35/394* (2024.01); *B01J 35/613* (2024.01);
(Continued)

(58) Field of Classification Search
CPC .... B01J 29/166; B01J 23/882; B01J 35/0066; B01J 35/1014; B01J 35/1019; B01J 35/1038; B01J 35/1042; B01J 35/1061
(Continued)

(56) References Cited

U.S. PATENT DOCUMENTS 4,191,635 A    3/1980    Quick et al.
4,255,288 A    3/1981    Cull et al.
(Continued)

FOREIGN PATENT DOCUMENTS

CN    108816273 A    11/2018
CN    110938468 A    3/2020
(Continued)

OTHER PUBLICATIONS

Machine translation of JP2017136588 downloaded Aug. 2023 Yusuke Matsumoto et al. (Year: 2017).*
(Continued)

*Primary Examiner* — Keling Zhang
(74) *Attorney, Agent, or Firm* — Leason Ellis, LLP (57) ABSTRACT

Hydrotreating catalyst material and/or hydrotreating catalyst particles are provided having at least two hydrotreating metal components and a chelating agent carried on a support. The support comprises an inorganic oxide binder and a post-framework modified ultra-stable Y-type (USY) zeolite in which a portion of aluminum atoms constituting a zeolite framework thereof is substituted with zirconium atoms and/or titanium atoms and/or hafnium atoms. The hydrotreating metal components form a metal complex via the chelating agent, and are carried on said support as chelating complex type II active sites.

18 Claims, 2 Drawing Sheets

(51) Int. Cl.
    *B01J 35/30*     (2024.01)
    *B01J 35/61*     (2024.01)
    *B01J 35/63*     (2024.01)
    *B01J 35/64*     (2024.01)
    *C10G 45/12*     (2006.01)

(52) U.S. Cl.
    CPC ........... *B01J 35/615* (2024.01); *B01J 35/633* (2024.01); *B01J 35/635* (2024.01); *B01J 35/647* (2024.01); *C10G 45/12* (2013.01); *C10G 2300/1003* (2013.01); *C10G 2300/1011* (2013.01); *C10G 2300/1051* (2013.01); *C10G 2300/1059* (2013.01); *C10G 2300/1074* (2013.01); *C10G 2300/202* (2013.01); *C10G 2300/308* (2013.01)

(58) Field of Classification Search
    USPC .......................................................... 502/79
    See application file for complete search history.

(56) References Cited

U.S. PATENT DOCUMENTS

| | | | |
|---|---|---|---|
| 4,676,887 A * | 6/1987 | Fischer | C10G 47/16 208/68 |
| 4,918,225 A | 4/1990 | Rittner et al. | |
| 5,310,477 A | 5/1994 | Lomas | |
| 6,103,948 A | 8/2000 | Ginosar et al. | |
| 6,132,594 A | 10/2000 | Okazaki et al. | |
| 6,726,834 B2 | 4/2004 | Quesada et al. | |
| 6,855,856 B2 | 2/2005 | Van Broekhoven et al. | |
| 6,884,339 B2 | 4/2005 | Benazzi et al. | |
| 7,550,405 B2 | 6/2009 | Shan et al. | |
| 7,592,282 B2 | 9/2009 | Ginosar et al. | |
| 7,750,197 B2 | 7/2010 | Van Broekhoven et al. | |
| 7,858,069 B2 | 12/2010 | Ginosar et al. | |
| 8,002,970 B2 | 8/2011 | Euzen et al. | |
| 8,163,969 B2 | 4/2012 | Van Broekhoven et al. | |
| 8,395,006 B2 | 3/2013 | Clark et al. | |
| 8,574,542 B2 | 11/2013 | Domokos et al. | |
| 8,937,205 B2 | 1/2015 | Iaccino et al. | |
| 9,012,696 B2 | 4/2015 | Calaresu et al. | |
| 9,145,522 B2 | 9/2015 | Negiz et al. | |
| 9,150,494 B2 | 10/2015 | Tonkovich et al. | |
| 9,221,036 B2 | 12/2015 | Koseoglu et al. | |
| 9,238,599 B2 | 1/2016 | Winsett | |
| 9,376,325 B2 | 6/2016 | Domokos et al. | |
| 10,071,939 B2 | 9/2018 | Abudawoud | |
| 10,081,009 B2 | 9/2018 | Koseoglu et al. | |
| 10,173,950 B2 | 1/2019 | Abudawoud et al. | |
| 10,293,332 B2 | 5/2019 | Koseoglu et al. | |
| 10,427,143 B2 | 10/2019 | Domokos et al. | |
| 11,098,256 B2 | 8/2021 | Koseoglu et al. | |
| 2003/0168379 A1 | 9/2003 | Degnan et al. | |
| 2004/0162454 A1 | 8/2004 | Gao et al. | |
| 2006/0020154 A1 | 1/2006 | Lo et al. | |
| 2009/0118556 A1 | 5/2009 | Euzen et al. | |
| 2010/0305373 A1 | 12/2010 | Berna et al. | |
| 2011/0219671 A1 | 9/2011 | Hanks et al. | |
| 2012/0083643 A1 | 4/2012 | Rashidi et al. | |
| 2013/0175202 A1* | 7/2013 | Koseoglu | B01J 37/0201 502/67 |
| 2014/0190868 A1 | 7/2014 | Koseoglu et al. | |
| 2014/0262956 A1 | 9/2014 | Duma et al. | |
| 2015/0306585 A1 | 10/2015 | Gabriel et al. | |
| 2018/0223191 A1 | 8/2018 | Bauer et al. | |
| 2019/0022630 A1 | 1/2019 | Koseoglu et al. | |
| 2019/0194095 A1 | 6/2019 | Xu et al. | |
| 2019/0316044 A1* | 10/2019 | Koseoglu | B01J 37/0009 |
| 2021/0380424 A1 | 12/2021 | Luo et al. | |
| 2022/0062874 A1* | 3/2022 | Devers | B01J 35/1042 |

FOREIGN PATENT DOCUMENTS

| | | | | |
|---|---|---|---|---|
| EP | 0199555 | * | 10/1986 | |
| EP | 2060551 | A1 | 5/2009 | |
| GB | 1536590 | | 12/1978 | |
| JP | H07308581 | | 11/1995 | |
| JP | 2000334305 | A | 12/2000 | |
| JP | 2002255537 | A | 9/2002 | |
| JP | 2003226519 | A | 8/2003 | |
| JP | 6001531 | B2 | 10/2016 | |
| JP | 6042328 | B2 | 12/2016 | |
| JP | 2017136588 | A * | 8/2017 | ............. B01J 21/04 |
| NL | 7607060 | | 12/1977 | |
| WO | 2007032232 | A1 | 3/2007 | |
| WO | 2017112558 | A1 | 6/2017 | |
| WO | 2019147345 | A1 | 8/2019 | |
| WO | 2020078437 | A1 | 4/2020 | |
| WO | WO2020126680 | * | 6/2020 | |

OTHER PUBLICATIONS

Hensen et al., The relation between morphology and hydrotreating activity for supported MoS2 particles, Journal of Catalysis, 2001, 224-235 (Year: 2001).*

Machine translation of Matsumoto et al., JP2017136588A (Year: 2017).*

Cui et al. "Review on hydrodesulfurization over zeolite-based catalysts." Industrial & Engineering Chemistry Research 60.8 (2021): 3295-3323.

Hoekstra. "Catalyst Selection—A Refiner's Perspective." Nov. 2015 from Digital Refining. 2022. Crambeth Allen Publishing Ltd. 2 pages.

Juarez et al. "Transition metal containing zeolites and mesoporous MCM-41 as heterogeneous catalysts for the N-alkylation of 2, 4-diaminotoluene with dimethylcarbonate." Catalysis Communications 10.5 (2009): 472-476.

No Author. "Improved Hydrocracking." Criterion Catalysts & Technologies. (www.criterioncatalysts.com) No date. 4 pages.

Ojagh. "Hydrodeoxygenation (HDO) catalysts Characterization, reaction and deactivation studies." Department of Chemistry and Chemical Engineering, Chalmers University of Technology. Chalmers Tekniska Hogskola (Sweden), 2018. 82 pages.

Oliviero et al. "Organic additives for hydrotreating catalysts: A review of main families and action mechanisms." Catalysis Today 377 (2021): 3-16.

Rinaldi et al. "Preparation of Co—Mo/B2O3/Al2O3 catalysts for hydrodesulfurization: Effect of citric acid addition." Applied Catalysis A: General 360.2 (2009): 130-136.

Salam. "Kraft lignin valorization by hydrotreatment over Mo-based sulfided catalysts." Department of Chemistry and Chemical Engineering. Chalmers University of Technology. Chalmers Tekniska Hogskola (Sweden), 2022. 92 pages.

Song. "An overview of new approaches to deep desulfurization for ultra-clean gasoline, diesel fuel and jet fuel." Catalysis Today 86.1-4 (2003): 211-263.

Song et al. "New design approaches to ultra-clean diesel fuels by deep desulfurization and deep dearomatization." Applied Catalysis B: Environmental 41.1-2 (2003): 207-238.

Wang et al. "Hydrodesulfurization of transportation fuels over zeolite-based supported catalysts." Energy and Environment Focus 3.1 (2014): 45-52.

Wang et al. "Influence of Zirconium Modified USY on Coupled Hydrogenation and Ring Opening of Tetralin Over NiW/ USY+ Al2 O 3." Catalysis Letters 147.7 (2017): 1704-1713.

Intenational Search Report and Written Opinion in corresponding PCT Application No. PCT/US2023/084579, mailed Apr. 8, 2024; 7 pages.

* cited by examiner

TYPE II HYDROTREATING CATALYST FOR HYDROCARBON OIL AND METHOD FOR HYDROTREATING HYDROCARBON OIL

RELATED APPLICATIONS

Not applicable.

FIELD OF THE DISCLOSURE

The present disclosure relates to type II hydrotreating catalysts including post-framework modified ultra-stable Y-type (USY) zeolite, catalyst manufacturing processes, and methods of hydrotreating hydrocarbon oil.

BACKGROUND OF THE DISCLOSURE

The discharge into the atmosphere of sulfur compounds during processing and end-use of the petroleum products derived from sulfur-containing sour crude oil poses health and environmental problems. Stringent reduced-sulfur specifications applicable to transportation and other fuel products have impacted the refining industry, and it is necessary for refiners to make capital investments to greatly reduce the sulfur content in gas oils to 10 parts per million by weight (ppmw) or less. In the industrialized nations such as the United States, Japan and the countries of the European Union, refineries have already been required to produce environmentally clean transportation fuels. For instance, in 2007, the United States Environmental Protection Agency required the sulfur content of highway diesel fuel to be reduced 97 W %, from 500 ppmw (low sulfur diesel) to 15 ppmw (ultra-low sulfur diesel). The European Union has enacted even more stringent standards, requiring diesel and gasoline fuels sold in 2009 to contain less than 10 ppmw of sulfur. In 2017, the United States Environmental Protection Agency required the sulfur content of highway gasoline to be reduced to 10 ppmw. Other countries are following in the footsteps of the United States and the European Union and are moving forward with regulations that will require refineries to produce transportation fuels with ultra-low sulfur levels.

To keep pace with recent trends toward production of ultra-low sulfur fuels, refiners must choose among the processes or crude oils that provide flexibility that ensures future specifications are met with minimum additional capital investment, in many instances by utilizing existing equipment. Conventional technologies such as hydrocracking and two-stage hydrotreating offer solutions to refiners for the production of clean transportation fuels. These technologies are available and can be applied as new grassroots production facilities are constructed. However, many existing hydroprocessing facilities, such as those using relatively low pressure hydrotreaters, represent a substantial prior investment and were constructed before these more stringent sulfur reduction requirements were enacted. It is very difficult to upgrade existing hydrotreating reactors in these facilities because of the comparatively more severe operational requirements (i.e., higher temperature and pressure) to obtain clean fuel production. Available retrofitting options for refiners include elevation of the hydrogen partial pressure by increasing the recycle gas quality, utilization of more active catalyst compositions, installation of improved reactor components to enhance liquid-solid contact, the increase of reactor volume, and the increase of the feedstock quality.

There are many hydrotreating units installed worldwide producing transportation fuels containing 500-3,000 ppmw sulfur. These units were designed for, and are being operated at, relatively mild conditions (i.e., low hydrogen partial pressures of 30 kg/cm$^2$ for straight run gas oils boiling in the range of from 180-370° C.).

With the increasing prevalence of more stringent environmental sulfur specifications in transportation fuels mentioned above, the maximum allowable sulfur levels are being reduced to no greater than 15 ppmw, and in some cases no greater than 10 ppmw. This ultra-low level of sulfur in the end product typically requires either construction of new high pressure hydrotreating units, or a substantial retrofitting of existing facilities, e.g., by incorporating gas purification systems, reengineering the internal configuration and components of reactors, and/or deployment of more active catalyst compositions.

Sulfur-containing compounds that are typically present in hydrocarbon fuels include aliphatic molecules such as sulfides, disulfides and mercaptans as well as aromatic molecules such as thiophene, benzothiophene and its alkylated derivatives, and dibenzothiophene and its alkyl derivatives such as 4,6-dimethyl-dibenzothiophene.

Aliphatic sulfur-containing compounds are more easily desulfurized (labile) using mild hydrodesulfurization methods. However, certain highly branched aromatic molecules can sterically hinder the sulfur atom removal and are moderately more difficult to desulfurize (refractory) using mild hydrodesulfurization methods.

Among the sulfur-containing aromatic compounds, thiophenes and benzothiophenes are relatively easy to hydrodesulfurize. The addition of alkyl groups to the ring compounds in close proximity of sulfur atom increases the difficulty of hydrodesulfurization. Dibenzothiophenes resulting from addition of another ring to the benzothiophene family are even more difficult to desulfurize, and the difficulty varies greatly according to their alkyl substitution, with di-beta substitution being the most difficult to desulfurize, thus justifying their "refractory" appellation. These beta substituents hinder exposure of the heteroatom to the active site on the catalyst.

The economical removal of refractory sulfur-containing compounds is therefore exceedingly difficult to achieve, and accordingly removal of sulfur-containing compounds in hydrocarbon fuels to an ultra-low sulfur level is very costly by current hydrotreating techniques. When previous regulations permitted sulfur levels up to 500 ppmw, there was little need or incentive to desulfurize beyond the capabilities of conventional hydrodesulfurization, and hence the refractory sulfur-containing compounds were not targeted. However, in order to meet the more stringent sulfur specifications, these refractory sulfur-containing compounds must be substantially removed from hydrocarbon fuels streams.

Figure 1:
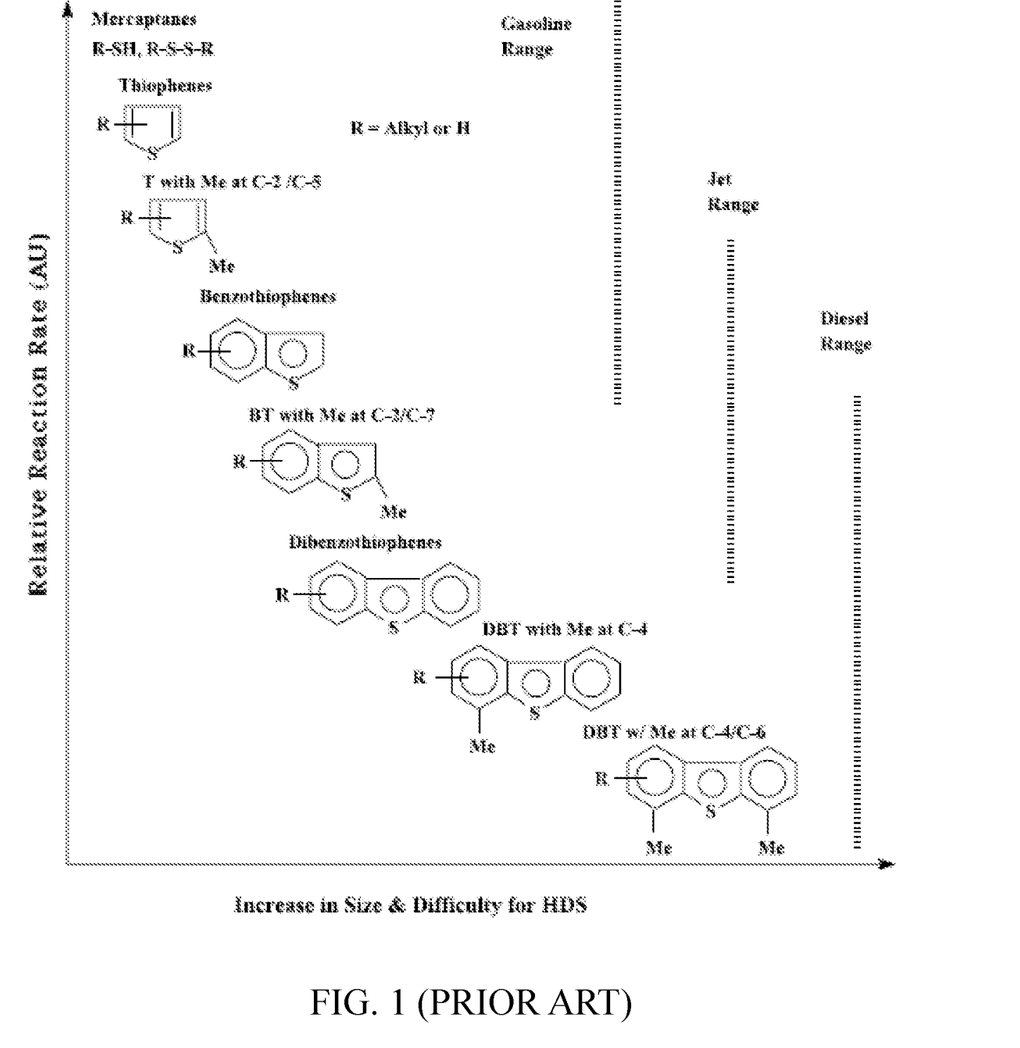
FIG. 1 sets forth the reactivity of various sulfur compounds.

The relative reactivity of thiols and sulfides are much higher than those of aromatic sulfur compounds and sulfides are much more reactive than the aromatic sulfur compounds. It should be noted that non-thiophenic sulfides such as paraffinic and/or naphthenic are present in diesel range hydrocarbons as can be seen from the relative reactivity chart shown in FIG. 1.

Studies have been conducted related to increasing the relative reactivity of sterically hindered sulfur-containing hydrocarbons. In particular, isomerization of 4,6-dimethyl-dibenzothiophene into methyl-migrated isomers and tri- or tetramethyl-dibenzothiophenes has been studied With the steady increase in demand for hydrocarbon fuels having an ultra-low sulfur level, a need exists for an efficient and effective process and apparatus for desulfurization, including more active catalyst compositions.

Hydrotreating catalysts typically comprise an amorphous based catalyst(s), such as amorphous alumina or silica-alumina or titania substrates containing active metals, Ni/Mo, Ni/W or Co/Mo or Co/Ni/Mo metals as the active phase, or amorphous catalyst, zeolite catalyst, or a composite mixture thereof. A commonly used zeolite is ultra-stable Y (hereafter "USY") zeolite. In certain embodiments in which an objective is hydrodenitrogenation, acidic alumina or silica alumina based catalysts loaded with Ni—Mo, or Ni—W active metals, or combinations thereof, are used. U.S. Pat. Nos. 9,221,036, 10,081,009 and 10,293,332 (the '036, '009 and '332 patents, or the '036 patent family), which are owned by the Applicants of the present invention and are incorporated by reference in their entireties, teach, inter alia, hydrocracking catalysts in which a USY framework has been substituted, in part, by one or more of zirconium, titanium, and hafnium. In these catalysts, the substituting metal (Ti, Zr, and/or Hf) substitutes for part of the aluminum in the aluminum/silica framework, and essentially become part of the framework. Processes for making these catalysts and their use, are all described in the '036, '009 and '332 patents.

Alternative approaches for developing catalysts of increased activity focus on tailoring the active sites for desired reactions. Widely accepted models include the Co—Mo—S model or Ni—Mo—S, where the Co—Mo—S structure or Ni—Mo—S structure is responsible for the catalytic activity of the Co-promoted or Ni-promoted $MoS_2$ catalyst. Among Co—Mo—S structures for alumina supported catalysts, a more active is known as type II (Co—Mo—S II), and the less active phase as type I (Co—Mo—S I). Type I structures are strongly bonded to support through Mo—O—Al linkages and has less stacking, whereas type II structures have higher stacking and fewer and weaker support linkages. It is believed that catalyst-support linkages in Co—Mo—S I hinder reactant molecules from approaching the catalytically active sites.

In regard to the above background information, the present disclosure is directed to provide a technical solution for an alternative catalyst material, including as catalysts used in hydrotreating of hydrocarbon oil distillates.

SUMMARY OF THE INVENTION

A hydrotreating catalyst is provided comprising a hydrotreating metal component and a chelating agent carried on a support. The support comprises an inorganic oxide binder and a post-framework modified ultra-stable Y (USY)-type zeolite catalyst in which a portion of aluminum atoms constituting a zeolite framework thereof is substituted with zirconium atoms and/or titanium atoms and/or hafnium atoms. The hydrotreating metal component forms a metal complex via the chelating agent, and is carried on said support as chelating complex type II active sites. In certain embodiments the at least hydrotreating metal component comprise one or more metals or metal compounds (oxides or sulfides) of Mo, W, Co or Ni.

In certain embodiments the post-framework modified USY zeolite comprise one or more of titanium, zirconium and/or hafnium substituting aluminum atoms constituting a zeolite framework of the USY zeolite. In certain embodiments the post-framework modified USY zeolite comprise titanium and zirconium substituting aluminum atoms constituting a zeolite framework of the USY zeolite. In certain embodiments the post-framework modified USY is substituted with about 0.1-5.0, 0.1-4.0, 0.1-3.0, 0.2-5.0, 0.2-4.0, 0.2-3.0, 0.3-5.0, 0.3-4.0 or 0.3-3.0 W % zirconium atoms, and about 0.1-5.0, 0.1-4.0, 0.1-3.0, 0.2-5.0, 0.2-4.0, 0.2-3.0, 0.3-5.0, 0.3-4.0 or 0.3-3.0 W % titanium atoms, calculated on an oxide basis.

In certain embodiments the post-framework modified USY comprises about 0.01-30, 0.1-30, 0.5-30, 1-30, 5-30, 10-30, 0.01-25, 0.1-25, 0.5-25, 1-25, 5-25, 10-25, 0.01-20, 0.1-20, 0.5-20, 1-20, 5-20 or 10-20 W % of the total mass of said hydrotreating catalyst. In certain embodiments the one or more hydrotreating metal components comprises about 0.01-40, 0.1-40, 1-40, 2-40, 5-40, 10-40, 0.01-30, 0.1-30, 1-30, 2-30, 5-30, 10-30, 0.01-20, 0.1-20, 1-20, 2-20 or 5-20 W % of the total mass of said hydrotreating catalyst. In certain embodiments at least two hydrotreating metal components are provided, including $MoS_x$ in an amount of about 0.01-30, 0.1-30, 1-30, 2-30, 5-30, 10-30, 15-30, 20-30, 0.01-25, 0.1-25, 1-25, 2-25, 5-25, 10-25, 15-25 or 20-25 W % relative to the total mass of said hydrotreating catalyst, and a one or more additional hydrotreating metal components comprising about 0.01-15, 0.1-15, 1-15, 2-15, 5-15, 0.01-10, 0.1-10, 1-10, 2-10 or 5-10 W % of the total mass of said hydrotreating catalyst.

In certain embodiments carbon is present in an amount of at least about 2 W % of the total mass of said hydrotreating catalyst. In certain embodiments mass loss resulting from heat treatment for 2 hours at 570° C. in atmospheric conditions is greater than about 10 W %. In certain embodiments the hydrotreating catalyst is sulfided and wherein the amount of nitric oxide adsorption after sulfiding is more than about 8.0 or 10.0 milliliters per gram.

In certain embodiments the chelating agent is selected from the group consisting of citric acid, maleic acid and ethylenediaminetetraacetic acid (EDTA). In certain embodiments the chelating agent comprises citric acid. In certain embodiments the chelating agent comprises an organic compound having a pKa in the range of about 1-20, 2-20 or 5-20. In certain embodiments the chelating agent is citric acid, carbon is present in an amount of at least about 2 W % of the total mass of said hydrotreating catalyst, mass loss resulting from heat treatment for 2 hours at 570° C. in atmospheric conditions is greater than about 10 W % and the amount of nitric oxide adsorption after sulfiding of the hydrotreating catalyst is more than about 8.0 or 10.0 milliliters per gram.

In certain embodiments the catalyst has a specific surface area in the range of about 100-400, 100-300, 100-250, 100-220, 150-400, 150-300, 150-250 or 150-220 m$^2$/g; an average pore diameter (measured by the mercury press-fit method) in the range of about 7.0-15.0, 7.0-13.0, 8.0-15.0 or 8.0-13.0 nm; and a pore volume (less than 600 nm diameter pores) in the range of about 0.4-1.0, 0.4-0.8, 0.4-0.75, 0.4-0.65, 0.45-1.0, 0.45-0.8, 0.45-0.75 or 0.45-0.65 ml/g. In certain embodiments the post-framework modified USY in the hydrotreating catalyst generally has: unit cell dimensions (UD) generally in the range of about 2.425-2.450 or 2.430-2.450 nm; specific surface area generally in the range of about 600-900, 600-800, 650-900 or 650-800 m$^2$/g; pore volume of about 0.3-0.75, 0.4-0.75, 0.3-0.6 or 0.4-0.6 ml/g; and a $SiO_2/Al_2O_3$ molar ratio in the range of about 5-100, 10-100, 20-100, 5-80, 10-80, 20-80, 25-100 or 25-80.

A method for hydrotreating hydrocarbon oil is also provided comprising hydrotreating hydrocarbon oil with the hydrotreating catalyst described herein. In certain embodiments hydrotreating comprises loading a flow reactor with the hydrotreating catalyst, wherein the flow reactor is selected from the group consisting of a stirred tank, an ebullient bed reactor, a baffled slurry tank, a fixed bed reactor, a rotating tubular reactor and a slurry-bed reactor. In certain embodiments the hydrocarbon oil subjected to hydrotreating is obtained from (1) crude oil, (2) synthetic crude oil, (3) bitumen, (4) oil sand, (5) shale oil, (6) coal liquid, (7) plastic pyrolysis oil and/or (8) bio-mass derived oils. In certain embodiments the method for hydrotreating hydrocarbon oil further comprises: filling a hydrotreating apparatus which is a flow reactor with the hydrotreating catalyst; and treating a hydrocarbon oil comprising middle distillates in the presence of hydrogen at a reactor temperature (° C.) in the range of from about 270-430, 300-430, 320-430, 340-430, 270-420, 300-420, 320-420, 340-420, 270-400, 300-400, 320-400, 340-400, 270-380, 300-380, 320-380, 340-360, 270-360, 300-360, 320-360 or 340-360; a hydrogen partial pressure (barg) in the range of from about 30-120, 30-100, 30-80, 30-70, 30-60, 35-120, 35-100, 35-80, 35-70, 35-60, 40-120, 40-100, 40-80, 40-70 or 40-60; a hydrogen gas feed rate (standard liters per liter of hydrocarbon feed, SLt/Lt) of up to about 1000, 700 or 500, in certain embodiments from about 200-1000, 200-700, 200-500, 250-1000, 250-700, 250-500, 300-1000, 300-700 or 300-500; and a liquid hourly space velocity (h−1), on a fresh feed volumetric rate relative to the volume of hydrotreating catalysts, in the range of from about 0.1-10.0, 0.1-6.0, 0.1-5.0, 0.1-4.0, 0.1-2.0, 0.5-10.0, 0.5-5.0, 0.5-2.0, 0.8-10.0, 0.8-6.0, 0.8-5.0, 0.8-4.0, 0.8-2.0, 1.0-10.0, 1.0-6.0, 1.0-5.0, 1.0-4.0 or 1.0-2.0. In certain embodiments the hydrocarbon oil comprises one or more of a) straight run middle distillates; b) one or more middle distillate fractions from hydroprocessing zones within the battery limits, such as hydroprocessing of vacuum gas oil, deasphalted oil (DAO) obtained from a solvent deasphalting process or demetallized oil, coker gas oil obtained from a coker process, cycle oil obtained from a fluid catalytic cracking (FCC) process or gas oil obtained from a visbreaking process; c) light cycle oil obtained from a FCC process; d) light coker gas oil obtained from a coker process; e) light visbreaking gas oil obtained from a visbreaking process; f) plastic pyrolysis oils g) or bio-mass derived oils. In certain embodiments the hydrocarbon oil comprises one or more of a) atmospheric gas oil (AGO), b) vacuum gas oil (VGO), c) deasphalted oil (DAO) obtained from a solvent deasphalting process or demetallized oil, d) light coker gas oil or heavy coker gas oil obtained from a coker process, e) cycle oil obtained from a fluid catalytic cracking (FCC) process, f) gas oil obtained from a visbreaking process; g) gas oil obtained from plastic pyrolysis oils; or h) bio-mass derived gas oils; wherein any of the feeds c) through h) include nominal boiling point ranges coinciding with that of atmospheric gas oil or vacuum gas oil.

Any combinations of the various embodiments and implementations disclosed herein can be used. These and other aspects and features can be appreciated from the following description of certain embodiments and the accompanying drawings and claims.

DETAILED DESCRIPTION OF CERTAIN EMBODIMENTS

Hydrotreating catalyst material and/or hydrotreating catalyst particles are provided having one or more hydrotreating metal components and a chelating agent carried on a support. The support comprises an inorganic oxide binder and a post-framework modified ultra-stable Y-type (USY) zeolite in which a portion of aluminum atoms constituting a zeolite framework thereof is substituted with zirconium atoms and/or titanium atoms and/or hafnium atoms. The hydrotreating metal components form a metal complex via the chelating agent, and are carried on said support as chelating complex type II active sites.

In certain embodiments the disclosure provides hydrotreating catalyst material and/or hydrotreating catalyst particles comprising one or more hydrotreating metal components and a chelating agent carried on a support, wherein said support comprises an inorganic oxide binder and a post-framework modified ultra-stable Y (USY)-type zeolite in which a portion of aluminum atoms constituting a zeolite framework thereof is substituted with zirconium atoms and/or titanium atoms and/or hafnium atoms. The hydrotreating metal components form a metal complex via the chelating agent, and are carried on said support as chelating complex type II active sites. In certain embodiments the one or more hydrotreating metal components comprise one or more metals or metal compounds (oxides or sulfides) of Mo, W, Co or Ni. The sulfide is formed in the catalyst after loading of the metals and sulfiding. A suitable sulfide of Mo comprises $MoS_x$, for example, wherein x is 2. The hydrotreating metal components form a metal complex via the chelating agent, and are carried on said catalyst as chelating complex type II active sites.

Compared to the disclosure of the '036 patent family, in which the hydrogenative metal component is in the form of type I active sites as a result of calcining the support material after the metal component is impregnated, the presently disclosed catalyst material and/or catalyst particles contains type II active sites.

In certain embodiments, a hydrotreating metal component comprises $MoS_x$, and the chelating complex of $MoS_x$ remains on the hydrotreating catalyst as type II active sites, which is more catalytically active for hydrotreating including desulfurization of than the type I active sites of the calcined catalysts. While not wishing to be bound by theory, it is expected that the inclusion of the chelating complex increases edge dispersion of $MoS_x$ on the support, and a resulting increase in NO adsorption capacity. In certain embodiments, in addition to $MoS_x$, one or more additional hydrotreating metal components are provided, for example a metal or metal compound (oxide or sulfide) of Co, Ni or W.

In certain embodiments, carbon content is indicative of catalysts having type II active sites, distinguished from catalysts having type I active sites. In certain embodiments, carbon content of the as-made hydrotreating catalyst material and/or catalyst particles (that is, prior to pre-sulfiding to enhance activation in a hydrotreating reactor) is greater than about 2.0 W % in the range of about 2.0-15, 2.0-12, 2.0-10, 2.5-15, 2.5-12, 2.5-10, 3.0-15, 3.0-12, or 3.0-10 W %. This is indicative of carbon content from the chelating agent, which is typically not present in catalysts containing type I active sites. In the preparation of catalysts having type II active sites, metal-loaded particles are dried without calcination after loading of the hydrotreating metal components. Therefore, carbon derived from chelating agents remains in type II catalyst. In contrast, during preparation of catalysts having type I active sites, chelating agents are sintered in the calcination step and hence there is very little carbon remaining, for example, less than about 1 W %.

In certain embodiments, decomposition testing is indicative of catalysts having type II active sites, distinguished from catalysts having type I active sites. For example, mass loss of as-made catalyst material and/or catalyst particles disclosed herein resulting from heat treatment for 2 hours at 570° C. in atmospheric conditions is greater than about 5, 10 or 15 W %, in certain embodiments about 5-30, 10-30, 15-30, 5-20 10-20 or 15-20 W %. Catalysts having type II active sites are prepared with the chelating agent and associated hydrocarbon compounds, and also absorbed water from the metal solution used to load active components of the catalyst.

An indicator of a type II catalyst is the nitric oxide adsorption after sulfiding of the as-made catalyst material and/or catalyst particle (that is, sulfur treatment of the catalyst for activation as is well known). In certain embodiments the amount of nitric oxide adsorption after sulfiding is more than about 8.0 or 10.0 milliliters per gram (ml/g), for example in the range of about 8.0-20 or 10-20 ml/g. In the as-made catalysts having type II active sites, remaining chelating complex enhanced the NO adsorption, which as described herein are sintered by calcination.

The chelating complex type II active sites that form the hydrotreating metal component herein are present on the outer and pore surfaces of a support material or particles. The support material (that is typically formed into particles) is a composite of an inorganic oxide binder component and a framework-modified USY zeolite component in which some of the aluminum atoms in the framework are substituted with zirconium atoms and/or titanium atoms and/or hafnium atoms. The as-made catalysts are provided as type II catalysts, without calcination after metal impregnation, to maintain the higher activity of the type II sites.

In the embodiments described herein, the ratio of the post-framework modified USY zeolite component and the inorganic oxide binder component is appropriately determined according to the object of the catalyst. For example, the post-framework modified USY zeolite content of the catalyst material or particles herein can be in the range of about 0.01-30, 0.1-30, 0.5-30, 1-30, 5-30, 10-30, 0.01-25, 0.1-25, 0.5-25, 1-25, 5-25, 10-25, 0.01-20, 0.1-20, 0.5-20, 1-20, 5-20 or 10-20 W %, with the remaining content being the inorganic oxide binder and the hydrotreating metal component, and in certain embodiments optionally one or more other zeolitic materials.

Figure 2:
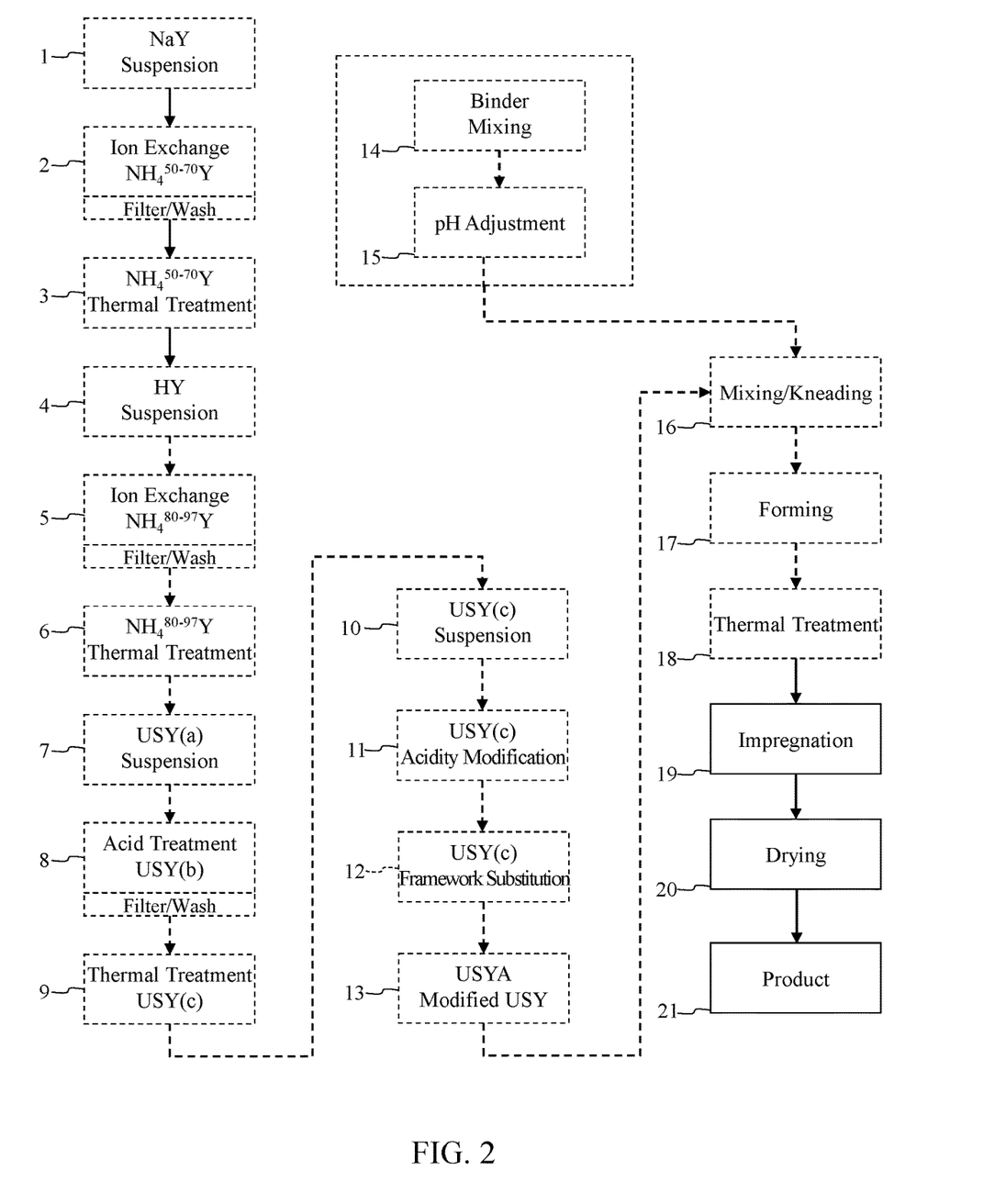
FIG. 2 is a process flow diagram showing steps for producing catalyst particles according to embodiments herein.

In the process description of this embodiment, it is understood that the underlying framework substituted USY zeolite material (prior to metal loading) and binder material can be provided from any suitable source, including as described herein in conjunction with FIG. 2 or from another source. Accordingly, steps corresponding to synthesis of framework substituted USY zeolite and binder material are shown in dashed lines in FIG. 2.

FIG. 2 shows process steps for producing catalyst particles having type II hydrotreating metal components on a composite support including the post-framework modified USY zeolite and a binder, including steps for producing a post-framework modified USY zeolite. Both the USY zeolite and the inorganic oxide material are characterized by outer surfaces and inner pore wall surfaces, and the composite and particles formed therefrom are characterized by outer surfaces and inner pore wall surfaces.

Catalyst particles produced in accordance with the method of FIG. 2 are calcined composite support particles of the post-framework modified USY zeolite described herein and a binder, having hydrotreating metal component added to the particles, and subsequently dried. Calcination of the final particles having hydrotreating metal component is avoided so as to maintain the hydrotreating metal component is carried on said catalyst as chelating complex type II active sites. In certain embodiments a hydrotreating metal component comprises $MoS_x$ (for example, wherein x is 2) and another hydrotreating metal component being a metal or metal compound (oxide or sulfide) of Co, Ni or W.

Steps 1-9 herein provide a description of a process for the synthesis of calcined USY zeolite (denoted as USY(c) herein), which is then post-framework modified at steps 10-13. In embodiments herein of the present invention, the USY that is post-framework modified can be obtained from another source, that is, one or more of steps 1-9 can be avoided. Steps 14-15 concern preparation of an inorganic oxide as a binder or granulating agent, and steps 16-21 concern forming composite catalyst support particles (steps 16-18) and forming the final particles with an effective quantity of a hydrotreating metal component including type II active sites (steps 19-21).

At step 1, a Y-type zeolite (Na—Y) is prepared by forming a suspension of an effective concentration of Na—Y, for instance in a liquid/solid ratio range of about 5-20, 5-15, 8-15, 5-12 or 8-12 liters (L) of water per kilogram (kg) of zeolite, and at an effective temperature, for instance in a range of about 15-95, 15-80, 20-95, 20-90, 20-80, 40-95, 40-90 or 40-80° C. The starting material at step 1 comprising a Na—Y-type zeolite having an effective $SiO_2/Al_2O_3$ molar ratio (SAR), for example in the range of about 3-6; an effective unit cell dimension (UD), for instance of about 2.466 nanometers (nm), an effective specific surface area (SA), for example in the range of about 600-900, 600-800, 650-900 or 650-800 square meters per gram ($m^2$/g), and an effective $Na_2O$ content, for instance of about 13 W %.

In an ion exchange step 2, a first ion-exchanged Y-type zeolite is synthesized by subjecting the Na—Y suspension from step 1 to ion exchange of sodium ions of the Na—Y with ammonium ions to prepare the first ion-exchanged Y-type zeolite (first $NH_4$—Y). In the first $NH_4$—Y, about 50-70% of Na contained in the Y-type zeolite is substituted with $NH_4$ for certain embodiments, also referred to as $NH_4^{50-70}$Y. An embodiment of the ion exchange at step 2 includes addition to the Na—Y suspension of: an effective concentration of an ammonium source, for instance a molar ratio of ammonium to Al in the range of about 2-8; at an effective temperature in a range of about 20-95, 20-90, 20-80, 40-95, 40-90 or 40-80° C.; and for an effective residence time, for instance in a range of about 10-600, 10-180, 30-600 or 30-180 minutes. The ammonium source can be one or more of $NH_4OH$, $(NH_4)_2SO_4$, $(NH_4)_2CO_3$, or another suitable ammonium source.

The resulting solids from the ion exchange step 2 can be filtered, washed with water at an effective temperature, for instance in a range of about 20-95, 20-90, 20-80, 40-95, 40-90 or 40-80° C., and dried at an effective temperature, for example in a range of about 80-180 or 100-180° C., for an effective residence time, for instance in a range of about 30-1800, 60-1800, 30-600 or 60-600 minutes, to obtain the first ion-exchanged $NH_4$—Y, $NH_4^{50-70}$Y Optionally, after washing the resulting solids from the ion exchange step 2, they can be washed in one or more additional cycles with an ammonium source followed by water washing, at effective temperatures, concentrations and residence times such as those at step 2. The solids matter that is washed one or more additional times is dried at effective temperatures and residence times such as those at step 2, to obtain the first ion-exchanged NH$_4$—Y, NH$_4^{50-70}$Y In certain instances, the one or more additional cycles of the first ion exchange step are not implemented.

In a thermal treatment step 3, a hydrogen type Y-type (HY) zeolite is synthesized from the first ion-exchanged NH$_4$—Y (NH$_4^{50-70}$Y) by heating in a saturated steam atmosphere. In certain embodiments the thermal treatment at step 3 comprises calcining the first ion-exchanged NH$_4$—Y at an effective temperature and for a time effective to produce HY zeolite, for instance with a temperature in a range of about 500-800, 500-700, 600-800 or 600-700° C. (typically in the presence of steam, that is, in a saturated water vapor, or in the presence of air or oxygen) and for a time range of about 10-600, 10-180, 30-600 or 30-180 minutes. In certain embodiments, if there remains a substantial amount of Na in the HY zeolite, ion exchange may be repeated one or more times as in step 2. The HY zeolite is converted to USY following additional ammonium ion exchange and steaming treatment discussed below at steps 4-6.

At steps 4-6, the HY zeolite is treated to synthesize a second ion-exchanged NH$_4$—Y zeolite having 80-97% of Na contained in the Na—Y exchanged with NH$_4$, also referred to as NH$_4^{80-97}$Y For instance, as depicted, at step 4 a suspension is prepared containing an effective concentration of HY zeolite, for instance in a solid/liquid mass ratio range of about 5-20, 5-15, 8-15, 5-12 or 8-12 L/kg (water/zeolite), and at an effective temperature, for instance in a range of about 15-95, 15-80, 20-95, 20-90, 20-80, 40-95, 40-90 or 40-80° C.

In an ion exchange step 5, a second ion-exchanged Y-type zeolite is synthesized by subjecting the NH$_4$—Y suspension from step 4 to ion exchange of 80-97 or 90-97% sodium ions of the Na—Y with ammonium ions to prepare a second ammonium-exchanged Y-type zeolite (second NH$_4$—Y), NH$_4^{80-97}$Y. An embodiment of the ion exchange at step 5 includes addition and stirring of an effective concentration of an ammonium, for instance a molar ratio of ammonium to Al in the range of about 2-8; at an effective temperature in a range of about 20-95, 20-90, 20-80, 40-95, 40-90 or 40-80° C.; and for an effective residence time, for instance in a range of about 10-600, 10-180, 30-600 or 30-180 minutes. The ammonium source can be one or more of NH$_4$OH, (NH$_4$)$_2$SO$_4$, (NH$_4$)$_2$CO$_3$, or another suitable ammonium source.

The resulting solids from the ion exchange step 5 can be filtered, washed with water at an effective temperature, for instance in a range of about 20-95, 20-90, 20-80, 40-95, 40-90 or 40-80° C., and dried at an effective temperature, for example in a range of about 80-180 or 100-180° C., for an effective residence time, for instance in a range of about 30-1800, 60-1800, 30-600 or 60-600 minutes, to obtain the second ion-exchanged NH$_4$—Y, NH$_4^{80-97}$Y Optionally, after washing the resulting solids from the ion exchange step 5, they can be washed in one or more additional cycles with an ammonium source followed by water washing, at effective temperatures, concentrations and residence times such as those at step 5. The solids washed one or more additional times are dried at effective temperatures and residence times such as those at step 5, to obtain the second ion-exchanged NH$_4$—Y, NH$_4^{80-97}$Y In certain instances, the one or more additional cycles of the second ion exchange step are not implemented.

In a thermal treatment step 6, a first ultra-stable Y-type zeolite, referred to herein as USY(a), is synthesized by calcining the NH$_4^{80-97}$Y Thermal treatment at step 6 comprises calcining the second ion-exchanged NH$_4$—Y at an effective temperature, for instance in a range of about 500-800, 500-700, 600-800 or 600-700° C. (typically in the presence of steam, that is, in a saturated water vapor, or in the presence of air or oxygen) and for a time range of about 10-600, 10-180, 30-600 or 30-180 minutes, to recover USY(a). In certain embodiments the thermal treatment of the NH$_4^{80-97}$Y is by steaming. The USY(a) from step 6 is USY zeolite that possesses a SAR that is approximately equivalent to that of the starting Na—Y The steps 1-6 should generally not significantly change the SAR value, because these steps to not entail acid treatment to target ejection of aluminum atoms from the zeolite framework. For example, the USY(a) thus obtained at step 6 can have a SAR of about 3-6.

At steps 7-9, the USY(a) zeolite is treated to synthesize calcined USY zeolite having an increased SAR, which is the starting material for subsequent post-framework modification. At step 7, an aqueous suspension is prepared containing an effective concentration of the USY(a), for instance in a solid/liquid mass ratio range of about 5-20, 5-15, 8-15, 5-12 or 8-12 L/kg (water/zeolite), and at an effective temperature, for instance in a range of about 15-95, 15-80, 20-95, 20-90, 20-80, 40-95, 40-90 or 40-80° C.

In an acid treatment step 8, an effective quantity of an inorganic acid or an organic acid is dispersed in the suspension so that a pH of the suspension is maintained in a strongly acidic range to synthesize a second ultra-stable Y-type zeolite, referred to herein as USY(b), having an increased SAR. Extraskeletal aluminum (aluminum atoms which do not form part of the zeolite framework) are removed from the USY(a) in order to obtain the USY(b) zeolite. This is carried out by acid treatment. The inorganic acid use can generally be sulfuric acid, nitric acid, hydrochloric acid and the like. In certain embodiments a selected inorganic acid is sulfuric acid or hydrochloric acid. Further, carboxylic acids can suitably be used as an organic acid. The amount of the inorganic acid or the organic acid added is the amount suitable to control the pH of the suspension in a strongly acidic range, for instance less than about 2.0 or 2.5, for example in a range of about 0.7-2.5, 0.7-2.0, 1.0-2.5 or 1.0-2.0. The amount may be, for example, a 0.5-4.0-fold, 0.5-3.5-fold, 0.7-4.0-fold or 0.7-3.5-0.5-fold molar increase based on an amount of Al$_2$O$_3$ in the USY(a). The acidic suspension is maintained at an effective temperature, for instance 15-95, 15-80, 20-95, 20-90, 20-80, 40-95, 40-90 or 40-80° and maintained for an effective residence time, for instance in a range of about 10-600, 10-180, 30-600 or 30-180 minutes. Acid treatment at step 8 increases the SAR of the Y-type zeolite, for example, from a range of about 3-6 to a range of about 30-100, 40-100, 30-80 or 40-80.

The resulting solids from the acid treatment step 8 can be filtered, washed with water at an effective temperature, for instance in a range of about 15-95, 15-80, 20-95, 20-90, 20-80, 40-95, 40-90 or 40-80° C., and dried at an effective temperature, for example in a range of about 80-180 or 100-180° C., for an effective residence time, for instance in a range of about 30-1800, 60-1800, 30-600 or 60-600 minutes, to recover USY(b). Optionally, after washing the resulting solids from the acid treatment step 8, they can be treated in one or more additional cycles with an inorganic acid or organic acid followed by water washing, at effective temperatures, concentrations and residence times such as those at step 8. The solids which are acid-treated one or more additional times are dried at effective temperatures and residence times such as those at step 8, to recover USY(b). In certain instances, the one or more additional cycles of the first acid treatment step are not implemented.

In a thermal treatment step 9, the USY(b) zeolite is subjected to thermal treatment to prepare a third ultra-stable Y-type zeolite, USY(c). In certain embodiments the thermal treatment at step 9 comprises calcining the second USY zeolite (USY(b)) at effective temperatures, for example in a range of about 500-700, 550-700, 500-650 or 550-650° C. (typically in the presence of air or oxygen, or in the presence of steam), and for a time range of about 10-600, 10-180, 30-600 or 30-180 minutes, to recover USY(c). If the calcining temperature is lower than about 500° C., the framework substitution amount of zirconium atoms and/or titanium atoms and/or hafnium atoms tends to be reduced; at calcining temperatures that exceed about 700° C., the specific surface area of the ultra-stable Y-type zeolite can be reduced, and a framework substitution amount of zirconium atoms and/or titanium atoms and/or hafnium atoms is thus reduced.

At steps 10-13 framework substitution is carried out to produce the post-framework modified USY zeolite having a portion of the aluminum atoms within the USY zeolite framework are substituted with zirconium and/or titanium and/or hafnium atoms. In certain embodiments, a post-framework modified USY zeolite material is produced by firing a USY zeolite having the properties described herein at about 500-700° C. A suspension is formed containing the fired USY zeolite, the suspension having a liquid/solid mass ratio of about 5-15. An inorganic acid or an organic acid is added so that a pH of the suspension is about <2.0. Subsequently a solution containing a zirconium compound and/or a titanium compound and/or a hafnium compound is mixed. The solution is neutralized with, for example, an aqueous ammonia, so that the pH of the mixed solution is about 7-7.5.

Suitable zirconium compounds described above include one or more of zirconium sulfate, zirconium nitrate, zirconium chloride and the like. In certain embodiments zirconium sulfate and/or zirconium nitrate are selected. The quantity of the zirconium compound added is generally about 0.1-5.0, 0.1-4.0, 0.1-3.0, 0.2-5.0, 0.2-4.0, 0.2-3.0, 0.3-5.0, 0.3-4.0 or 0.3-3.0 W %, as calculated on their oxide basis (that is, zirconium oxide) and as measured relative to the mass of the post-framework modified USY zeolite component. Addition of the zirconium compound in an amount of less than about 0.1 W % fails to improve solid acid characteristics of the zeolite. The addition of the zirconium compound in an amount exceeding 5 W % tends to cause clogging of pores of the zeolite. An aqueous solution of a zirconium compound prepared by dissolving the zirconium compound in water can be used as the zirconium compound.

Suitable titanium compounds include one or more of titanium sulfate, titanium acetate, titanium chloride, titanium nitrate, and titanium lactate. In certain embodiments titanium sulfate and/or titanium acetate are selected. The quantity of the titanium compound added is generally about 0.1-5.0, 0.1-4.0, 0.1-3.0, 0.2-5.0, 0.2-4.0, 0.2-3.0, 0.3-5.0, 0.3-4.0 or 0.3-3.0 W %, as calculated on their oxide basis (that is, titanium oxide) and as measured relative to the mass of the post-framework modified USY zeolite component. Addition of the titanium compound in an amount of less than about 0.1 W % fails to improve solid acid characteristics of the zeolite. The addition of the titanium compound in an amount exceeding 5 W % tends to cause clogging of pores of the zeolite. An aqueous solution of a titanium compound prepared by dissolving the titanium compound in water can be used as the titanium compound.

Suitable hafnium compounds described above include one or more of hafnium chloride, hafnium nitrate, hafnium fluoride, hafnium bromide, hafnium oxalate and the like. In certain embodiments hafnium chloride and/or hafnium nitrate are selected. The quantity of the hafnium compound added is generally about 0.1-5.0, 0.1-4.0, 0.1-3.0, 0.2-5.0, 0.2-4.0, 0.2-3.0, 0.3-5.0, 0.3-4.0 or 0.3-3.0 W %, as calculated on their oxide basis (that is, hafnium oxide) and as measured relative to the mass of the post-framework modified USY zeolite component. Addition of the hafnium compound in an amount of less than about 0.1 W % fails to improve solid acid characteristics of the zeolite. The addition of the hafnium compound in an amount exceeding 5 W % tends to cause clogging of pores of the zeolite. An aqueous solution of a hafnium compound prepared by dissolving the hafnium compound in water can be used as the hafnium compound.

A pH of the above suspension is controlled to about <2.0 to prevent a precipitate from being generated during mixing of the aqueous solution of the zirconium compound and/or the hafnium compound and/or the titanium compound with a suspension of the ultra-stable Y-type zeolite described above. Mixing of the aqueous solution of the zirconium compound and/or the hafnium compound and/or the titanium compound with a suspension of the ultra-stable Y-type zeolite is, in certain embodiments, is conducted by gradually adding said aqueous solution to the suspension. After completion of addition of the aqueous solution described above to the suspension, the solution can be mixed by stirring at a suitable temperature such as about 20-40 or 25-35° C. for about 3-5 hours. Further, after completion of the above-described mixing, the admixed solution is neutralized by adding an alkali compound such as aqueous ammonia and/or the like, so that a pH thereof is controlled to about 7.0-7.5, whereby the post-framework modified USY zeolite described herein is be obtained.

In this regard: when only the zirconium compound (or an aqueous solution thereof) is used as the compound (or an aqueous solution thereof) and added to the suspension described above, the post-framework modified USY zeolite (Zr-USY) in which zirconium atoms are substituted for a part of aluminum atoms forming the framework of the ultra-stable Y-type zeolite is formed; when only the titanium compound (or an aqueous solution thereof) is used, the post-framework modified USY zeolite (Ti-USY) in which titanium atoms are substituted for a part of aluminum atoms forming the framework of the ultra-stable Y-type zeolite is formed; when only the hafnium compound (or an aqueous solution thereof) is used, the post-framework modified USY zeolite (Hf-USY) in which hafnium atoms are substituted for a part of aluminum atoms forming the framework of the ultra-stable Y-type zeolite is formed; when the zirconium compound and the titanium compound (or aqueous solutions thereof) are used, the post-framework modified USY zeolite in the catalyst (Zr—Ti-USY) in which zirconium atoms and titanium atoms are substituted for a part of aluminum atoms forming the framework of the ultra-stable Y-type zeolite is formed; when the zirconium compound and the hafnium compound (or aqueous solutions thereof) are used, the post-framework modified USY zeolite in the catalyst (Zr—Hf-USY) in which zirconium atoms and hafnium atoms are substituted for a part of aluminum atoms forming the framework of the ultra-stable Y-type zeolite is formed; when the hafnium compound and the titanium compound (or aqueous solutions thereof) are used, the post-framework modified USY zeolite in the catalyst (Hf—Ti-USY) in which hafnium atoms and titanium atoms are substituted for a part of aluminum atoms forming the framework of the ultra-stable Y-type zeolite is formed; and when the zirconium compound, the titanium compound and the hafnium compound (or aqueous solutions thereof) are used, the post-framework modified USY zeolite in the catalyst (Zr—Ti—Hf-USY) in which zirconium atoms, titanium atoms and hafnium atoms are substituted for a part of aluminum atoms forming the framework of the ultra-stable Y-type zeolite is formed.

The resulting framework-substituted zeolite can be filtered, if desired, washed with water, and dried at about 80-180° C.; the mixture may be quasi-equilibrated with steam, for instance, at a temperature of from about 600-800° C. for about 10-20 hours. For instance, at step 10, the calcined USY(c) zeolite from step 9 is prepared for acid treatment by forming a suspension of an effective concentration USY(c), for instance in a liquid/solid mass ratio range of about 5:1-15:1, 5:1-12:1, 8:1-15:1 or 8:1-12:1, by dispersion in water at an effective temperature, for example, in the range of about 15-95, 15-80, 20-95, 20-90, 20-80, 40-95, 40-90 or 40-80° C.

In an acid treatment step 11, an effective quantity of an inorganic acid or an organic acid is dispersed in the suspension so that a pH of the suspension is maintained in a strongly acidic range to prepare the zeolite for metal insertion in the framework, step 12. In certain embodiments, this can be stepwise as in the '036 patent family. In additional embodiments, for example as disclosed in commonly owned U.S. Ser. No. 11/305,264B2 which is incorporated by reference herein in its entirety, acid treatment to prepare the zeolite for metal insertion in the framework can occur together with the metal insertion. The inorganic acid use can generally be sulfuric acid, nitric acid, hydrochloric acid and the like. In certain embodiments the selected inorganic acid is sulfuric acid or hydrochloric acid. Further, carboxylic acids can suitably be used as the organic acid described above. The amount of the inorganic acid or the organic acid added is the amount suitable to control the pH of the suspension in a strongly acidic range, for instance less than about 2.0 or 2.5, for example in a range of about 0.7-2.5, 0.7-2.0, 1.0-2.5 or 1.0-2.0. The acidic suspension is maintained at an effective temperature, for instance in the range of about 15-80, 15-60, 15-35, 15-30 or 20-60° C. and maintained for an effective residence time, and maintained for an effective residence time, for instance in a range of about 10-600, 10-180, 30-600 or 30-180 minutes.

In a metal insertion step 12, the framework substitution is carried out. The acid-modified USY(c) zeolite suspension is subjected to metals treatment to substitute some of the aluminum atoms forming the framework of the ultra-stable Y-type zeolite. In certain embodiments, this is carried out by adding to the acidity modified USY(c) a solution containing transition metal compounds. In certain embodiments the transition metal compounds comprise a zirconium compound and/or a titanium compound and/or a hafnium compound. The solution is maintained at an effective temperature, for instance 15-80, 15-60, 15-35, 15-30, 20-60, 15-35 or 15-30° C. and for an effective residence time, for instance in a range of about 10-600, 10-180, 30-600 or 30-180 minutes. The suspension from step 12 can be neutralized with, for example, an aqueous ammonia, to a pH in the range of about 7.0-7.5. The resulting solids from the metal insertion step 12 can be filtered, washed with water at an effective temperature, for instance in a range of about 15-95, 15-80, 20-95, 20-90, 20-80, 40-95, 40-90 or 40-80° C., and dried at an effective temperature, for example in a range of about 80-180 or 100-180° C., for an effective residence time, for instance in a range of about 30-1800, 60-1800, 30-600 or 60-600 minutes, and the post-framework modified USY zeolite (USYA) is recovered at step 13.

Ultra-stable Y-type zeolite is used as the raw materials for preparing the post-framework modified USY zeolite, referred to above as USY(c). As noted above, one or more of the steps 1-9 can be used to prepare the USY introduced at step 10, or otherwise obtained. Said USY introduced at step 10 generally has properties of known USY zeolites, which can be synthesized or modified (as in one or more of the steps 1-9 or alternative methodologies), or sourced, so as to provide a USY zeolite having a SAR in the range of about 30-100, 40-100, 30-80 or 40-80 for effective metal insertion. The known USY-type zeolite refers to zeolite having a unit cell dimension (UD) generally in the range of about 2.425-2.450 or 2.430-2.450 nm; a specific surface area generally in the range of about 600-900, 600-800, 650-900 or 650-800 m$^2$/g; and a pore volume of about 0.3-0.75, 0.4-0.75, 0.3-0.6 or 0.4-0.6 ml/g. Known USY-type zeolites also generally possess a SAR in the range of about 5-200, 10-200, 20-200, 5-100, 10-100, 20-100, 5-80, 10-80, 20-80, 25-100 or 25-80; as noted herein, this SAR can be selected or modified to provide an effective USY for metal insertion. For example, suitable zeolites are FAU framework (zeolite Y) having its micropore pore formed by a 12-membered ring when viewed along the [111] direction is 7.4×7.4 Å. The UD, also referred to as a crystal lattice constant, can be measured by reference to ASTM method D3942, Standard Test Method for Determination of the Unit Cell Dimension of a Faujasite-Type Zeolite. The specific surface area is a value determined by the BET (Brunauer-Emmett-Teller) method using nitrogen adsorption. The ultra-stable Y-type zeolite may be prepared by any method known in the art. This ultra-stable Y-type zeolite is subjected to post-framework modification as described herein to form post-framework modified USY zeolite that is used to produce composite catalyst particles.

The post-framework modified USY zeolite incorporates one or more of zirconium, titanium, and hafnium into its framework. Effective concentrations of the Zr, Ti, and/or Hf include about 0.1-5.0, 0.1-4.0, 0.1-3.0, 0.2-5.0, 0.2-4.0, 0.2-3.0, 0.3-5.0, 0.3-4.0 or 0.3-3.0 W %, as calculated on their oxide basis (that is, $ZrO_2$, $TiO_2$ and/or $HfO_2$) and as measured relative to the mass of the post-framework modified USY zeolite. In certain embodiments, the amounts of individual materials supplying Zr, Ti, and/or Hf can be less than 0.1, 0.2 or 0.3 W %, but when combined, the total is at least 0.1, 0.2 or 0.3 W %. It is appreciated by a person of skill in the art, that when the framework-substituted zeolite in the catalyst contains the zirconium atoms and the titanium atoms and/or the hafnium atoms described above, a mass ratio (in terms of oxides) of the zirconium atoms to the titanium atoms and/or the hafnium atoms is not specifically be restricted, and any ratio of zirconium or titanium or hafnium that is effective for the intended use of the catalyst particles can be used, for example, for hydrotreating of heavy hydrocarbon oil. In certain embodiments the post-framework modified USY zeolite is: a framework-substituted zeolite in which a part of aluminum atoms forming a zeolite framework is substituted only with zirconium atoms, and is referred to as a "zirconium-substituted zeolite" or "Zr-USY"; a framework-substituted zeolite in which a part of aluminum atoms forming a zeolite framework is substituted only with titanium atoms, and is referred to as a "titanium-substituted zeolite" or "Ti-USY"; a framework-substituted zeolite in which a part of aluminum atoms forming a zeolite framework is substituted only with hafnium atoms, and is referred to as a "hafnium-substituted zeolite" or "Hf-USY"; a framework-substituted zeolite in which a part of aluminum atoms forming a zeolite framework is substituted only with zirconium atoms and titanium atoms, and is referred to as a "zirconium-titanium-substituted zeolite" or "Zr—Ti-USY"); a framework-substituted zeolite in which a part of aluminum atoms forming a zeolite framework is substituted only with hafnium atoms and titanium atoms, and is referred to as a "hafnium-titanium-substituted zeolite" or "Hf—Ti-USY"); a framework-substituted zeolite in which a part of aluminum atoms forming a zeolite framework is substituted only with zirconium atoms and hafnium atoms, and is referred to as a "zirconium-hafnium-substituted zeolite" or "Zr—Hf-USY"); and a framework-substituted zeolite in which a part of aluminum atoms forming a zeolite framework is substituted only with zirconium atoms, titanium and hafnium atoms, and is referred to as "zirconium-titanium-hafnium substituted zeolite" or "Zr—Ti—Hf-USY."

The presence of the zirconium atoms and/or titanium and/or hafnium atoms which are substituted for the aluminum atoms in the post-framework modified USY zeolite serve as constituents of the framework of the USY zeolite. Substitution can be verified by, for example, X-ray fluorescence, high frequency plasma emission spectrometry, atomic absorption spectrometry, ultraviolet-visible-near-infrared spectrophotometry (UV-Vis-NIR), Fourier transform infrared spectroscopy (FT-IR), and/or nuclear magnetic resonance spectrometry (NMR).

In certain embodiments the framework substituted USY zeolite component is provided in a "wet" state, whereby the solid material from the framework substitution step, step 12, is filtered/washed and provided in a wet state, whereby the drying step typically utilized is not carried out (carried out to a lesser degree) so that water remains entrained in the solids. In certain embodiments the framework substituted USY zeolite component is provided in a "dry" state, whereby the solid material from the framework substitution step, step 12, is filtered, and dried, but provided in an uncalcined state, whereby the thermal treatment step to calcine the material that is typically utilized is not carried out. In certain embodiments the framework substituted USY zeolite component is provided in a "calcined" state, whereby the solid material from the framework substitution step, step 12, is filtered, dried, and calcined. Accordingly, in embodiments of FIG. 2, the USYA is provided as wet, dry (uncalcined) or calcined zeolite material.

A binder is provided to form a composite with the post-framework modified USY zeolite that is formed into particles (extrudates). In FIG. 2, steps 14 and 15 are shown to from an inorganic oxide as a binder or granulating agent, which is subsequently combining with the post-framework modified USY zeolite and extruded, steps 16 and 17. At step 14, a solution is prepared that will precipitate into the one or more inorganic oxides used as the binder or granulating agent, hereinafter the inorganic oxide component. For example, a suitable binder can be prepared from a gel of alumina or another inorganic oxide as is known in the art. In certain embodiments, solid inorganic oxides can be used directly as the binder materials. Alternatively, a commercially available inorganic oxide component can be provided, as is known to those skilled in the art, and prepared for mixing with the post-framework modified USY zeolite, for example by kneading. As the inorganic oxide, a porous inorganic oxide used in hydrotreating or other catalyst compositions in the related art can be used. Examples thereof include alumina, silica, titania, silica-alumina, alumina-titania, alumina-zirconia, alumina-boria, phosphorus-alumina, silica-alumina-boria, phosphorus-alumina-boria, phosphorus-alumina-silica, silica-alumina-titania, silica-alumina-zirconia, alumina-zirconia-titania, and phosphorous-alumina-zirconia.

The post-framework modified USY zeolite and the inorganic binder are combined to form the catalyst support material with known processes for forming catalysts, for example, by mixing and kneading the components (step 16), then forming them into the desired shapes by coextruding or otherwise forming composite support particles (step 17). The composite support particles are calcined (step 18).

The composite support material is formed of the post-framework modified USY zeolite material, for example from step 13 herein, one or more inorganic oxide components (for example from step 15 herein), and optionally one or more other zeolitic materials. The composite support material generally has a surface area in the range of about 150-500, 150-450, 200-500, 200-450 or 300-450 m²/g, and a pore volume in the range of about 0.4-0.8, 0.4-0.75, 0.4-0.65, 0.45-0.8, 0.45-0.75 or 0.45-0.65 ml/g. The content of the post-framework modified USY zeolite component, the inorganic oxide component and the hydrotreating metal component are appropriately determined according to the object. For example, the post-framework modified USY zeolite content of the catalyst particles formed with the composite support material can be in the range of about 0.01-30, 0.1-30, 0.5-30, 1-30, 5-30, 10-30, 0.01-25, 0.1-25, 0.5-25, 1-25, 5-25, 10-25, 0.01-20, 0.1-20, 0.5-20, 1-20, 5-20 or 10-20 W %, with the remaining content being the inorganic oxide and the hydrotreating metal component, and in certain embodiments optionally one or more other zeolitic materials.

In the mixing/kneading step 16, post-framework modified USY zeolite, for instance recovered from step 13 or otherwise provided, and the inorganic binder for instance recovered from step 15 or otherwise provided, are mixed together. The mixing is at effective ratios as noted above, and at a suitable temperature, for example, in the range of about 15-80, 15-60, 15-35, 15-30 or 20-60° C. The mixture is kneaded/mulled with an effective amount of water, for instance, at a liquid/solid mass ratio range of about 30-80, for an effective kneading/mulling time, for instance in a range of about 10-180 minutes. Therefore, the kneading/mulling of the wet solid materials forms a dough that is subsequently formed and dried. The kneaded/mulled product can be subjected to thermal treatment in order to obtain a more intimate contact between components and better homogeneity by thermal diffusion and solid-state reactions. The kneaded/mulled material thus obtained is extruded, forming step 17, through a die with an effective cross-sectional shape and dimension, and at a suitable temperature, for example, in the range of about 15-80, 15-60, 15-35, 15-30 or 20-60° C. Effective cross-sectional shapes include, for instance, cylindrical, trilobe, twisted trilobe, or quadrilobe. Effective cross-sectional dimensions include, for instance, a diameter or effective diameter in the range of about 0.8-3 or 0.8-2.5 millimeters. The resulting extrudates are dried at an effective temperature, for example in a range of about 80-180 or 100-180° C., for an effective residence time, for instance in a range of about 30-1800, 60-1800, 30-600 or 60-600 minutes, to recover dried composite extrudates. Optionally, the separate drying step can be avoided, whereby the composite extrudates are passed to a thermal treatment step 18 for calcination. In the thermal treatment step 18, the composite extrudates (optionally dried) are subjected to thermal treatment to prepare calcined composite particles. In certain embodiments the thermal treatment at step 18 comprises calcining the composite extrudates (optionally dried) at effective temperatures (typically in the presence of air or oxygen, or in the presence of steam), for example in a range of about 400-800, 400-700, 400-650, 500-800, 500-700, 500-650, 550-800, 550-700, 550-650, 600-800 or 600-700° C., and for a time range of about 10-600, 10-180, 30-600 or 30-180 minutes, to recover calcined composite particles.

In certain embodiments herein, a process commences by providing calcined composite particles which are the same or similar to those recovered at step 18 described above. The composite of post-framework modified USY zeolite and binder, whether provided from another source, or manufactured described herein, have impregnated therein a hydrotreating metal component. In certain embodiments the one or more hydrotreating metal components comprise metals or metal compounds (oxides or sulfides) of Mo, W, Co or Ni. A suitable sulfide of Mo comprises $MoS_x$, for example, wherein x is 2. The hydrotreating metal component(s) are carried on said catalyst as chelating complex type II active sites.

The hydrotreating metal components may be contained in catalyst in effective concentrations. For example, total hydrotreating metal content in hydrotreating catalysts herein can be present in an amount as is known in the related art, for example about 0.01-40, 0.1-40, 1-40, 2-40, 5-40, 10-40, 0.01-30, 0.1-30, 1-30, 2-30, 5-30, 10-30, 0.01-20, 0.1-20, 1-20, 2-20 or 5-20 W % in terms of oxide or sulfide. In certain embodiments, the hydrotreating metal component includes $MoS_x$ and one or more oxides of W, Co or Ni, wherein the concentration of $MoS_x$ in hydrotreating catalysts herein is about 0.01-30, 0.1-30, 1-30, 2-30, 5-30, 10-30, 15-30, 20-30, 0.01-25, 0.1-25, 1-25, 2-25, 5-25, 10-25, 15-25 or 20-25 W %, and wherein the concentration of one or more oxides of W, Co or Ni is about 0.01-15, 0.1-15, 1-15, 2-15, 5-15, 0.01-10, 0.1-10, 1-10, 2-10 or 5-10 W %.

Referring to FIG. 2, the hydrotreating metal components are loaded in the calcined composite support particles (step 19). The so-formed catalyst particles are then dried (step 20) without calcination after loading of the hydrotreating metal components. The final product, the catalyst particles having hydrotreating metal components carried on said support as chelating complex type II active sites, is recovered (step 21). In certain embodiments the post-framework modified USY zeolite material in the final particles serves as an active catalytic material in addition to the impregnated hydrotreating metal components of the catalyst particle.

At the hydrotreating metal component loading step 19 in the embodiment of FIG. 2, hydrotreating metal components are added. Several methods can be used to add hydrotreating metal components to the support, including but not limited to impregnation by immersion, incipient wetness, and evaporative, or co-mulling.

In certain embodiments, impregnation carried out is by immersion where support particles that have been formed (e.g., extruded) and calcined are immersed in an excess of an aqueous solution containing hydrotreating metal components and a chelating agent; the solution fills the pores and is also adsorbed on the support surface, and excess solution is removed; and the metal-loaded support is dried. In certain embodiments, impregnation is carried out using incipient wetness by tumbling or spraying support particles that have been formed (e.g., extruded) and calcined with a volume of an aqueous solution containing hydrotreating metal components and a chelating agent; and the metal-loaded support is dried. In certain embodiments, evaporative impregnation is carried out, in which support particles that have been formed (e.g., extruded) and calcined are saturated with water or with acid solution and immersed into an aqueous solution containing hydrotreating metal components and a chelating agent; hydrotreating metal components diffuses into the pores of the support through the aqueous phase, and the metal-loaded support is dried.

The chelating agent can be a suitable complexing compound to bind hydrotreating metal components to form a metal complex. A coordination complex includes a metal central atom surrounded by bound molecules, referred to as ligands or complexing agents, to form a metal complex. When a polydentate ligand creates multiple bonds with the metal central atom, the resulting complex is referred to as a metal chelate. A chelating agent can include coordinating groups with different combinations of one or more simple groups, for example, —OH, —COOH or —NH$_2$. In certain embodiments a chelating agent includes coordinating groups with two or more donor atoms (O, N, S). In certain embodiments a chelating agent is selected from the group consisting of citric acid, maleic acid and ethylenediaminotetraacetic acid (EDTA). In certain embodiments a chelating agent is an organic compound having a pKa in the range of about 1-20, 2-20 or 5-20 (where pKa is the negative log base ten of the acid disassociation constant (Ka) value).

The aqueous solution containing hydrotreating metal components and a chelating agent comprises effective quantities of the respective components. In certain embodiments a hydrotreating metal aqueous solution comprises: one or more metals compounds in an amount of about 25-60, 25-55, 25-50, 30-60, 30-55 or 30-50 W % of the total solution; and a chelating agent in an amount of about 5-25, 10-25, 5-20 or 10-20 W % of the total solution. In certain embodiments, a hydrotreating metal aqueous solution comprises: one or more metals compounds in an amount of about 25-60, 25-55, 25-50, 30-60, 30-55 or 30-50 W % of the total solution; a chelating agent in an amount of about 5-25, 10-25, 5-20 or 10-20 W % of the total solution; and phosphoric acid in an amount of about 2-15, 2-10, 5-15 or 5-10 W % of the total solution. In certain embodiments, a hydrotreating metal aqueous solution comprises: a molybdenum compound in an amount of about 30-50, 30-40 or 35-40 W % of the total solution; a cobalt or nickel compound in an amount of about 5-20 or 10-20 W % of the total solution; a chelating agent in an amount of about 5-25, 10-25, 5-20 or 10-20 W % of the total solution; and phosphoric acid an amount of about 2-15, 2-10, 5-15 or 5-10 W % of the total solution.

In certain embodiments, the hydrotreating metal component loading step 19 comprises immersing the calcined composite support particles, formed of the post-framework modified USY zeolite and a binder, in an aqueous solution containing hydrotreating metal components and a chelating agent. The quantity and concentration of the aqueous solution containing hydrotreating metal components and a chelating agent is dependent on the desired quantity of the hydrotreating metal components to be loaded on the composite support particles. In certain embodiments of the above methods, the volume of aqueous solution containing hydrotreating metal components and a chelating agent is equal to or slightly less than the pore volume of the support. The solution is maintained at an effective temperature, for instance about 40-100, 40-99, 60-100, 60-99, 60-97, 70-99, 70-97, 80-99, 80-97 or 90-99° C. and for an effective residence time, for instance in a range of about 40-1200, 40-600, 40-360, 60-1200, 60-600, 60-360, 120-1200, 120-600, 120-360, 180-1200, 180-600, 180-360, or 240-360 minutes. The resulting solids are typically filtered.

In certain embodiments of step 19, loading can be attained by loading the metal solution of an appropriate concentration up to the available pore volume of the composite material. In further embodiments of step 19, a lesser amount is used to control the loading of the hydrotreating metal components. For example, an effective volume of the loading metal solution can be, for instance, in the range of about 1-100, 1-99, 1-90, 20-100, 20-99, or 20-90 V % relative to the total pore volume of the inorganic oxide support material. In further embodiments of step 19, wet composite material is used. The wet binder material contains water within all or a portion of the pore volume, for instance, in the range of about 1-100, 1-99, 1-90, 50-100, 50-99, or 50-90 V % relative to the total pore volume. This volume can be controlled by partial drying of the of the material to alter the degree of wetness. The hydrotreating metal solution, whether provided by immersion, incipient wetness, or evaporative impregnation, is completely or partially blocked from the saturated pores, and as such there is less diffusion of metals into pores. Therefore, the metals can be principally positioned at the external surface of the composite with a limited amount in the pores.

In a drying step 20, filtered solids are dried at an effective temperature for example in a range of about 80-180, 80-170, 80-160, 80-150, 100-180, 100-170, 100-160 or 100-150° C. Drying occurs for an effective residence time, for instance in a range of about 30-1800, 60-1800, 30-600 or 60-600 minutes, to recover composite support particles, formed of the post-framework modified USY zeolite and a binder, having the hydrotreated metal components carried on said catalyst as chelating complex type II active sites.

At step 21, the final hydrotreating catalyst product is recovered. The hydrotreating catalyst generally has a specific surface area in the range of about 100-400, 100-300, 100-250, 100-220, 150-400, 150-300, 150-250 or 150-220 m$^2$/g; average pore diameter (measured by the mercury press-fit method) in the range of about 7.0-15.0, 7.0-13.0, 8.0-15.0 or 8.0-13.0 nm; and a pore volume (less than 600 nm diameter pores) in the range of about 0.4-1.0, 0.4-0.8, 0.4-0.75, 0.4-0.65, 0.45-1.0, 0.45-0.8, 0.45-0.75 or 0.45-0.65 ml/g. The post-framework modified USY in the hydrotreating catalyst generally possesses: unit cell dimensions (UD) generally in the range of about 2.425-2.450 or 2.430-2.450 nm; specific surface area generally in the range of about 600-900, 600-800, 650-900 or 650-800 m$^2$/g; a pore volume of about 0.3-0.75, 0.4-0.75, 0.3-0.6 or 0.4-0.6 ml/g; and a SAR in the range of about 5-100, 10-100, 20-100, 5-80, 10-80, 20-80, 25-100 or 25-80.

In any of the above-described embodiments, one or more additional zeolitic components (that is, a zeolite material other than the post-framework modified USY zeolite or metal-loaded post-framework modified USY zeolite) can be integrated, for instance at step in which the post-framework modified USY zeolite is mixed with inorganic oxide. The amount of said additional zeolitic material, if used at all, can be in the range of about 0.01-30, 0.1-30, 0.5-30, 1-30, 5-30, 10-30, 0.01-25, 0.1-25, 0.5-25, 1-25, 5-25, 10-25, 0.01-20, 0.1-20, 0.5-20, 1-20, 5-20 or 10-20 W %, with the remaining content being the post-framework modified USY zeolite, the inorganic oxide binder and the hydrotreating metal component. Said additional zeolitic material can include but is not limited to mordenite, ZSM-5, ZSM-11, ZSM-12, ZSM-22, ZSM-23, ZSM 35, beta-type, Y and USY (wherein this USY zeolitic component is not the same as the post-framework modified USY zeolite described herein). For example, these can be (FAU) framework, which includes USY, having a micropore size related to the 12-member ring when viewed along the [111] direction of 7.4×7.4 Å; (MFI) framework, which includes ZSM-5, having a micropore size related to the 10-member rings when viewed along the [100] and [010] directions of 5.5×5.1 Å and 5.6×5.3 Å, respectively; (MEL) framework, which includes ZSM-11, having a micropore size related to the 10-member ring when viewed along the [100] direction of 5.4×5.3 Å; (MTW) framework, which includes ZSM-12, having a micropore size related to the 12-member ring when viewed along the [010] direction of 5.6×6.0 Å; (TON) framework, which includes ZSM-12, having a micropore size related to the 10-member ring when viewed along the [001] direction of 4.6×5.7 Å; (MTT) framework, which includes ZSM-23, having a micropore size related to the 10-member ring when viewed along the [001] direction of 4.5×5.2 Å; (FER) framework, which includes ZSM-35, having a micropore size related to the 10-member ring and 8-member ring when viewed along the [001] and [010] directions of 4.2×5.4 Å and 3.5×4.8 Å, respectively; (MOR) framework, which includes mordenite zeolites, having a micropore size related to the 12-member ring and 8-member ring when viewed along the [001] and [001] directions of 6.5×7.0 Å and 2.6×5.7 Å, respectively; and (*BEA) framework, which includes zeolite beta polymorph A, having a micropore size related to the 12-member rings when viewed along the [100] and [001] directions of 6.6×6.7 Å and 5.6×5.6 Å, respectively.

In certain embodiments a method for hydrotreating hydrocarbon oil is provided, including hydrotreating hydrocarbon oil with the hydrotreating catalyst described above. In certain embodiments, a method for hydrotreating hydrocarbon oil comprises introducing a hydrocarbon oil, for instance having a boiling point range including all or a portion of middle distillate range hydrocarbon oil, in the presence of hydrogen, to a hydrotreating zone including one or more reactors operating at a reactor temperature (° C.) in the range of from about 270-430, 300-430, 320-430, 340-430, 270-420, 300-420, 320-420, 340-420, 270-400, 300-400, 320-400, 340-400, 270-380, 300-380, 320-380, 340-360, 270-360, 300-360, 320-360 or 340-360; a hydrogen partial pressure (barg) in the range of from about 30-120, 30-100, 30-80, 30-70, 30-60, 35-120, 35-100, 35-80, 35-70, 35-60, 40-120, 40-100, 40-80, 40-70 or 40-60; a hydrogen gas feed rate (standard liters per liter of hydrocarbon feed, SLt/Lt) of up to about 1000, 700 or 500, in certain embodiments from about 200-1000, 200-700, 200-500, 250-1000, 250-700, 250-500, 300-1000, 300-700 or 300-500; and a liquid hourly space velocity (h$^{-1}$), on a fresh feed volumetric rate relative to the volume of hydrotreating catalysts, in the range of from about 0.1-10.0, 0.1-6.0, 0.1-5.0, 0.1-4.0, 0.1-2.0, 0.5-10.0, 0.5-5.0, 0.5-2.0, 0.8-10.0, 0.8-6.0, 0.8-5.0, 0.8-4.0, 0.8-2.0, 1.0-10.0, 1.0-6.0, 1.0-5.0, 1.0-4.0 or 1.0-2.0. "Hydrotreating zone" means one or more reactors and associated effluent separation apparatus, and can contain two or more reactors.

In certain embodiments, a flow reactor used in a method for hydrotreating hydrocarbon oil described above can be a flow reactor selected from a stirring bath type reactor, a boiling bed type reactor, a baffle-equipped slurry bath type reactor, a fixed bed type reactor, a rotary tube type reactor and a slurry bed type reactor.

In certain embodiments, the hydrocarbon oil in the method for hydrotreating hydrocarbon described above contains distillate fractions of hydrocarbon oil obtained from (1) crude oil, (2) synthetic crude oil, (3) bitumen, (4) oil sand, (5) shale oil, (6) coal liquid, (7) plastic pyrolysis oil and/or (8) bio-mass derived oils. In certain embodiments, the hydrocarbon oil hydrotreated in the method for hydrotreating hydrocarbon described above contains hydrocarbon oil obtained from atmospheric distillation. In certain embodiments, the hydrocarbon oil hydrotreated in the method for hydrotreating hydrocarbon described above contains hydrocarbon oil obtained from vacuum distillation.

In certain embodiments, the hydrocarbon oil in the method described above comprises, consists of, or consists essentially of middle distillates. In certain embodiments, the term "middle distillate" is used with reference to one or more fractions containing hydrocarbons having a nominal boiling range of about 160-400, 160-380, 160-370, 160-360, 160-340, 170-400, 170-380, 170-370, 170-360, 170-340, 180-400, 180-380, 180-370, 180-360, 180-340, 190-400, 190-380, 190-370, 190-360, 190-340, 193-400, 193-380, 193-370, 193-360, or 193-340° C. In certain embodiments, the term "straight run middle distillate" is used with reference to one or more straight run fractions from the atmospheric distillation unit. In additional embodiments, term "middle distillate" is used to refer to fractions from one or more refinery operations boiling in this range, including but not limited to hydroprocessing (including hydrocracking) operations, fluid catalytic cracking (FCC) operations, coker operations, or visbreaking operations.

In certain embodiments, the hydrocarbon oil in the method described above comprises, consists of, or consists essentially of middle distillates that are one or more of a) straight run middle distillates; b) one or more middle distillate fractions from hydroprocessing zones within the battery limits, such as hydroprocessing of vacuum gas oil, deasphalted oil (DAO) obtained from a solvent deasphalting process or demetallized oil, coker gas oil obtained from a coker process, cycle oils obtained from a fluid catalytic cracking (FCC) process or gas oil obtained from a visbreaking process; c) light cycle oil obtained from a FCC process; d) light coker gas oil obtained from a coker process; e) light visbreaking gas oil obtained from a visbreaking process; f) plastic pyrolysis oils; or g) bio-mass derived oils. In certain embodiments, a method for hydrotreating hydrocarbon oil is effective to hydrodesulfurize and hydrodenitrogenize the hydrocarbon oil including middle distillates to less than 10 ppmw sulfur and nitrogen. In certain embodiments, a method for hydrotreating hydrocarbon oil is effective to increases the cetane index (for instance as calculated based on ASTM D4737) or cetane number (for instance as determined based on ASTM D613) of the hydrocarbon oil including middle distillates by at least 2, 3, 4 or 5 points.

In certain embodiments, the hydrocarbon oil in the method described above comprises, consists of, or consists essentially of hydrocarbons in the atmospheric gas oil range. In certain embodiments, the term "atmospheric gas oil" or its acronym AGO is used with reference to one or more fractions containing hydrocarbons having a nominal boiling range of about 250-400, 250-380, 250-370, 250-360, 250-340, 250-320, 260-400, 260-380, 260-370, 260-360, 260-340, 260-320, 270-400, 270-380, 270-370, 270-360, 270-340 or 270-320° C. In certain embodiments, the term "straight run atmospheric gas oil" is used with reference to one or more straight run fractions from the atmospheric distillation unit. In additional embodiments, term "atmospheric gas oil" is used to refer to fractions from one or more refinery operations boiling in this range, including but not limited to hydroprocessing (including hydrocracking) operations, fluid catalytic cracking (FCC) operations, coker operations, or visbreaking operations.

In certain embodiments, the hydrocarbon oil in the method described above comprises, consists of, or consists essentially of hydrocarbons in the vacuum gas oil range. In certain embodiments, the term "vacuum gas oil" or its acronym VGO is used with reference to one or more fractions containing hydrocarbons having a nominal boiling range of about 370-565, 370-550, 370-540, 370-530, 370-510, 400-565, 400-550, 400-540, 400-530, 400-510, 420-565, 420-550, 420-540, 420-530 or 420-510° C. In certain embodiments, the term "straight run vacuum gas oil" is used with reference to one or more straight run fractions from the vacuum distillation unit. In additional embodiments, term "vacuum gas oil" is used to refer to fractions from one or more refinery operations boiling in this range, including but not limited to hydroprocessing (including hydrocracking) operations, fluid catalytic cracking (FCC) operations, coker operations, or visbreaking operations.

In certain embodiments, the hydrocarbon oil in the method described above comprises, consists of, or consists essentially of heavy hydrocarbon oil that is one or more of a) atmospheric gas oil (AGO), b) vacuum gas oil (VGO), c) deasphalted oil (DAO) obtained from a solvent deasphalting process or demetallized oil, d) light coker gas oil or heavy coker gas oil obtained from a coker process, e) cycle oil obtained from a fluid catalytic cracking (FCC) process, f) gas oil obtained from a visbreaking process; g) gas oil obtained from plastic pyrolysis oils; or h) bio-mass derived gas oils; wherein any of the feeds c) through h) can include nominal boiling point ranges coinciding with that of AGO or VGO.

EXAMPLES

The examples provide post-framework modified USY zeolites having Type II active sites therein. The post-framework modified USY zeolites have titanium and zirconium replacing aluminum atoms in the USY zeolite framework (Ti—Zr-USY). The process corresponds to that disclosed in the '036 patent family (Examples 1 and 5).

50.0 kg of a Na—Y zeolite having a $SiO_2/Al_2O_3$ molar ratio of 5.2, a unit cell dimension of 2.466 nm, a specific surface area of 720 $m^2/g$, and a $Na_2O$ content of 13.0 W %, was suspended in water (liquid/solid mass ratio of 12.5 L of water per kg of zeolite) at a temperature of 60° C. Then, 14.0 kg of ammonium sulfate was added thereto. The resulting suspension was stirred at 70° C. for 1 hour and filtered. The resulting solid was washed with water. Then the solid was washed with an ammonium sulfate solution of 14.0 kg of ammonium sulfate dissolved in 500 L of water having a temperature of 60° C., washed with 500 L of water having a temperature of 60° C., dried at 130° C. for 20 hours, thereby affording about 45 kg of a Y zeolite ($NH_4^{65}Y$) in which 65% of sodium (Na) contained in Na—Y was ion-exchanged with ammonium ion ($NH_4^+$). The content of $Na_2O$ in $NH_4^{65}Y$ was 4.5 W %. Next, 40 kg of $NH_4^{65}Y$ was fired in a saturated water vapor atmosphere at 670° C. for 1 hour to form a hydrogen-Y zeolite (HY).

40 kg of HY was suspended in 400 L of water having a temperature of 60° C. Then, 49.0 kg of ammonium sulfate was added thereto. The resulting mixture was stirred at 90° C. for 1 hour and washed with 200 L of water having a temperature of 60° C. The mixture was then dried at 130° C. for 20 hours, thereby affording about 37 kg of a Y zeolite ($NH_4^{95}Y$) in which 95% of Na contained in the initial Na—Y was ion-exchanged with $NH_4$. About 33 kg of the synthesized $NH_4^{95}Y$ was fired in a saturated water vapor atmosphere at 650° C., for 1 hour, thereby affording about 15 kg of an ultra-stable Y zeolite (hereinafter, also referred to as "USY(a)") having a $SiO_2/Al_2O_3$ molar ratio of 5.2, a Na$_2$O content of 0.6 W %, a crystal lattice constant of 2.438 nm, specific surface area of 635 m$^2$/g and a crystallinity of 98%.

Next, 26 kg of this USY(a)) was suspended in 260 L of water having a temperature of 60° C. After 61.0 kg of 25% sulfuric acid by mass was gradually added to the suspension, the suspension was stirred at 70° C. for one hour to dissolve extraskeletal aluminum. The suspension was filtered. The resulting solid was washed with 260 liter of deionized water having a temperature of 60° C. and dried at 130° C. for 20 hours, thereby affording an ultra-stable Y-type zeolite (hereinafter, also referred to as "USY (b)") having a SiO$_2$/Al$_2$O$_3$ molar ratio of 30.2, a crystal lattice constant of 2.436 nm, specific surface area of 710 m$^2$/g and a crystallinity of 105%. USY (b) was fired at 600° C. for 1 hour, thereby affording about 17 kg of ultra-stable Y-type zeolite (hereinafter, also referred to as "USY (c)") having a SiO$_2$/Al$_2$O$_3$ molar ratio of 30.1, a crystal lattice constant of 2.436 nm, specific surface area of 712 m$^2$/g and a crystallinity of 105%.

1 kg of the USY(c) is suspended in 10 L of water at 25° C. The pH of the suspension is adjusted to 1.6 by gradually adding 25 W % sulfuric acid. Then 86 g of a solution containing 18 W % zirconium sulfate and 60 g of a solution containing 33 W % titanium sulfate was added thereto. The resulting mixture was stirred for 4 hours at room temperature. Then the pH was adjusted to 7.2 with 15 W % aqueous ammonia. After the mixture was stirred for 1 hour at room temperature, the mixture was filtered. The resulting solid was washed with 10 L of water and dried at 130° C. for 20 hours, thereby affording about 1 kg of a titanium-zirconium-substituted zeolite (Ti—Zr-USY) having a SiO$_2$/Al$_2$O$_3$ molar ratio of 40, a crystal lattice constant of 2.432 nm, specific surface area of 720 m$^2$/g, a crystallinity of 95%, a ZrO$_2$ content of 0.97 W % (relative to the total mass of Ti—Zr-USY) and a TiO$_2$ content of 0.98 W % (relative to the total mass of Ti—Zr-USY).

In certain of the examples, calcined extrudates formed of a composite of Ti—Zr-USY (with a SAR of 40) and alumina were loaded with active metals. A summary of the catalyst compositions is shown in Table 1.

To prepare an alumina binder, 40 kg of an aqueous solution of 3.3 W % sodium aluminate on an Al$_2$O$_3$ basis was mixed with 27 kg of an aqueous solution of 2.5 W % aluminum sulfate on an Al$_2$O$_3$ basis. Further, the mixture was stirred at 60° C. for 1 hour, and then the product was washed with 150 L of a 0.3 W % ammonia aqueous solution to remove Na$_2$SO$_4$. Next, the product from which Na$_2$SO$_4$ was removed was diluted with deionized water to adjust an Al$_2$O$_3$ concentration to 10 W %, and the pH was adjusted to about 10 with 15 W % aqueous ammonia. The mixture was stirred at 95° C. for 10 hours, dehydrated, washed, and kneaded with a kneader, thereby providing an alumina mixture. The alumina knead product thus prepared was mixed with the Ti—Zr-USY zeolite at a dry mass ratio alumina to zeolite of 7:3. The mixture was formed into a columnar shape having a diameter of 1.8 mm, dried at 110° C. for 12 hours, and calcined at 550° C. for 3 hours, thereby preparing calcined composite particles.

Example Catalysts: Eight type of catalyst were prepared with two series. In series one, four catalysts were prepared as type I and in series two, four catalysts were prepared as type II. In each series, one catalyst had no zeolite (100% amorphous alumina) and other three catalysts had 1 W %, 5 W % and 10 W % Ti—Zr post framework modified USY zeolite (Ti—Zr-USY), with the remaining content being amorphous alumina. The hydrotreating metal content of all catalysts was fixed at 6 W % cobalt and 25 W % molybdenum. An aqueous hydrotreating metal solution was prepared containing molybdenum trioxide (37.9 W %), cobalt(II) carbonate (14.9 W %), orthophosphoric acid (7.4 W %) and citric acid (15.5 W %) and an immersion impregnation technique was used to incorporate the metal content in the as-made catalyst particles. The series one catalysts were calcined after metal loading. The series two catalysts were dried at 110° C. for 1 hour without calcination. Carbon content, mass loss and NO adsorption data for these eight catalysts are shown in Table 1. Indicators of the type II catalysts include significantly higher mass loss, carbon content, and NO adsorption.

TABLE 1

| Zeolite Content, W % | NO Adsorption, ml/g | | Carbon content, W % | | Mass loss, W % | |
| --- | --- | --- | --- | --- | --- | --- |
| | Type I | Type II | Type I | Type II | Type I | Type II |
| 0 | 6.5 | 11.3 | 0.1 | 4.1 | 4.3 | 18.7 |
| 1 | 6.6 | 13.5 | 0.2 | 3.4 | 1.9 | 18.2 |
| 5 | 6.6 | 13.4 | 0.1 | 2.9 | 4.2 | 15.0 |
| 10 | 7.0 | 13.9 | 0.1 | 3.6 | 3.7 | 15.1 |

Example 1: A middle distillate stream having a nominal boiling point range of 180-370° C. with a density of 0.85 g/cc containing 1.15 W % of sulfur and 100 ppmw of nitrogen was desulfurized over a type II Co/Mo on Alumina hydrodesulfurization catalyst at 60 bars of hydrogen partial pressure at 310, 325 and 340° C. and LHSV of 1 h$^{-1}$. Results are shown in Table 2. The sulfur level in the product was lowered to 5.1 ppmw level at 340° C.

TABLE 2

| | Type II Co—Mo/Al (0 W % Zeolite) | | |
| --- | --- | --- | --- |
| Temperature, ° C. | 310 | 325 | 340 |
| Density @15, g/cm$^3$ | 0.8353 | 0.8308 | 0.8263 |
| Sulfur, ppmw | 502 | 37 | 5.1 |
| Nitrogen, ppmw | 1.4 | 0.0 | 0.0 |
| C$_1$-C$_4$, W % | 0.1 | 0.44 | 0.78 |
| Naphtha (36-145° C.), W % | 0.3 | 0.5 | 0.9 |
| Kerosene (145-260° C.), W % | 22.4 | 24.3 | 26.2 |
| Gas oil (260-360° C.), W % | 64.8 | 63.3 | 61.3 |
| 360° C.+, W % | 12.4 | 11.5 | 10.8 |

Example 2: The feedstock used in Example one 1 was hydrodesulfurized at the same conditions over a type II Co/Mo on alumina hydrodesulfurization catalyst containing 1 W % Ti—Zr-USY zeolite. The results are shown in Table 3. The sulfur level in the product was lowered to 4.6 ppmw level at 340° C. Addition of zeolite enhances the hydrodesulfurization and hydrodenitrogenation levels. The zeolite containing catalyst resulted in slightly higher distillate yields due to zeolite acidity.

TABLE 3

| | Type II Co—Mo/Al (1 W % Zeolite) | | |
| --- | --- | --- | --- |
| Temperature, ° C. | 310 | 325 | 340 |
| Density @15, g/cm$^3$ | 0.8342 | 0.8296 | 0.8245 |
| Sulfur, ppmw | 375 | 25 | 4.6 |
| Nitrogen, ppmw | 0.6 | 0.0 | 0.0 |
| C$_1$-C$_4$, W % | 0.20 | 0.51 | 0.83 |

TABLE 3-continued

|  | Type II Co—Mo/Al (1 W % Zeolite) | | |
| --- | --- | --- | --- |
| Naphtha (36-145° C.), W % | 0.3 | 0.7 | 1.2 |
| Kerosene (145-260° C.), W % | 23.4 | 25.4 | 27.2 |
| Gas oil (260-360° C.), W % | 65.7 | 63.7 | 61.6 |
| 360° C.+, W % | 10.5 | 9.8 | 9.2 |

Example 3: The feedstock used in Example one 1 was hydrodesulfurized at the same conditions over a type II Co/Mo on alumina hydrodesulfurization catalyst containing 5 W % Ti—Zr-USY zeolite. The results are shown in Table 4. The sulfur level in the product was lowered to 3.0 ppmw level at 340° C. Addition of zeolite enhances the hydrodesulfurization and hydrodenitrogenation levels. The zeolite containing catalyst resulted in slightly higher distillate yields due to zeolite acidity.

TABLE 4

|  | Type II Co—Mo/Al (5 W % Zeolite) | | |
| --- | --- | --- | --- |
| Temperature, ° C. | 310 | 325 | 340 |
| Density @15, g/cm$^3$ | 0.834 | 0.8291 | 0.8238 |
| Sulfur, ppmw | 216 | 14 | 3.0 |
| Nitrogen, ppmw | 0.0 | 0.0 | 0.0 |
| $C_1$-$C_4$, W % | 0.23 | 0.56 | 0.95 |
| Naphtha (36-145° C.), W % | 0.2 | 0.6 | 1.0 |
| Kerosene (145-260° C.), W % | 23.0 | 25.1 | 27.6 |
| Gas oil (260-360° C.), W % | 65.6 | 63.3 | 61.0 |
| 360° C.+, W % | 10.9 | 10.4 | 9.5 |

Example 4: The feedstock used in Example one 1 was hydrodesulfurized at the same conditions over a type II Co/Mo on alumina hydrodesulfurization catalyst containing 10 W % Ti—Zr-USY zeolite. The results are shown in Table 5. The sulfur level in the product was lowered to 3.2 ppmw level at 340° C. Addition of zeolite enhances the hydrodesulfurization and hydrodenitrogenation levels. The zeolite containing catalyst resulted in slightly higher distillate yields due to zeolite acidity.

TABLE 5

|  | Type II Co—Mo/Al (10 W % Zeolite) | | |
| --- | --- | --- | --- |
| Temperature, ° C. | 310 | 325 | 340 |
| Density @15, g/cm$^3$ | 0.8338 | 0.8286 | 0.8221 |
| Sulfur, ppmw | 274 | 20 | 3.2 |
| Nitrogen, ppmw | 0.0 | 0.0 | 0.0 |
| $C_1$-$C_4$, W % | 0.26 | 0.62 | 1.18 |
| Naphtha (36-145° C.), W % | 0.1 | 0.5 | 0.9 |
| Kerosene (145-260° C.), W % | 22.7 | 24.9 | 28.3 |
| Gas oil (260-360° C.), W % | 65.8 | 63.5 | 61.0 |
| 360° C.+, W % | 11.4 | 11.1 | 9.8 |

In the descriptions herein, the "hydrotreating metal component" is distinct and separate from the metals that replace the aluminum atoms in the USY zeolite framework, and in particular refers to the one or more metals or metal compounds (oxides or sulfides) that are impregnated in the support and form type II active sites.

It is to be understood that like numerals in the drawings represent like elements through the several figures, and that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "including," "comprising," or "having," "containing," "involving," and variations thereof herein, when used in this specification, specify the presence of stated features, integers, steps, operations, elements, and/or components, but do not preclude the presence or addition of one or more other features, integers, steps, operations, elements, components, and/or groups thereof. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Unless otherwise defined, all technical and scientific terms used herein have the same meaning as commonly understood by one of ordinary skill in the art to which this invention belongs. In case of conflict, the present specification, including definitions, will control. Although methods and materials similar or equivalent to those described herein can be used in the practice or testing of embodiments of the present invention, suitable methods and materials are described below. In addition, the materials, methods, and examples are illustrative only and not intended to be limiting.

When an amount, concentration, or other value or parameter is given as either a range, preferred range or a list of upper preferable values and/or lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Notably, the figures and examples above are not meant to limit the scope of the present disclosure to a single implementation, as other implementations are possible by way of interchange of some or all the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific implementations will so fully reveal the general nature of the disclosure that others can, by applying knowledge within the skill of the relevant art(s), readily modify and/or adapt for various applications such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings accordingly to one example and other dimensions can be used without departing from the disclosure.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

The invention claimed is:

1. A hydrotreating catalyst for hydrotreating middle distillates having a nominal boiling range of about 160-400° C., the hydrotreating catalyst comprising:
one or more hydrotreating metal components and a chelating agent carried on a support, said support comprising an inorganic oxide binder and a post-framework modified ultra-stable Y (USY) zeolite in which a portion of aluminum atoms constituting a zeolite framework thereof is substituted with zirconium atoms and/or titanium atoms and/or hafnium atoms,
wherein the one or more hydrotreating metal components form a metal complex via the chelating agent, and are carried on said support as chelating complex type II active sites,
wherein carbon including carbon content from the chelating agent is present in an amount of at least about 2 weight % of a total mass of said hydrotreating catalyst,
wherein mass loss of the hydrotreating catalyst resulting from heat treatment for 2 hours at 570° C. in atmospheric conditions is greater than about 10 weight % of the total mass of said hydrotreating catalyst prior to the heat treatment; and
wherein the hydrotreating catalyst is sulfided and wherein an amount of nitric oxide adsorption after sulfiding is more than about 10.0 milliliters per gram.

2. The hydrotreating catalyst as in claim 1, wherein the one or more hydrotreating metal components comprise sulfides of Mo, W, Co or Ni.

3. The hydrotreating catalyst of claim 2, wherein the hydrotreating catalyst comprises at least two hydrotreating metal components including about 0.01-30 weight % of $MoS_2$ and 0.01-15 weight % of one or more additional hydrotreating metal component, based on the total mass of hydrotreating catalyst.

4. The hydrotreating catalyst of claim 1, wherein the post-framework modified USY zeolite comprise two or more of titanium, zirconium and/or hafnium substituting aluminum atoms constituting a zeolite framework of the USY zeolite.

5. The hydrotreating catalyst of claim 1, wherein the post-framework modified USY zeolite comprise titanium and zirconium substituting aluminum atoms constituting a zeolite framework of the USY zeolite.

6. The hydrotreating catalyst of claim 5, wherein the post-framework modified USY zeolite is substituted with about 0.1-5.0 weight % zirconium atoms, and about 0.1-5.0 weight % titanium atoms, calculated on an oxide basis.

7. The hydrotreating catalyst of claim 1, wherein the post-framework modified USY zeolite comprises about 0.01-30 weight % of the total mass of said hydrotreating catalyst.

8. The hydrotreating catalyst of claim 1, wherein the one or more hydrotreating metal components comprises about 0.01-40 weight % of the total mass of said hydrotreating catalyst.

9. The hydrotreating catalyst of claim 1, wherein the chelating agent is selected from the group consisting of citric acid, maleic acid and ethylenediaminotetraacetic acid (EDTA).

10. The hydrotreating catalyst of claim 1, wherein the chelating agent comprises citric acid.

11. The hydrotreating catalyst of claim 1, wherein the chelating agent comprises an organic compound having a pKa in a range of about 1-20.

12. The hydrotreating catalyst of claim 1, having a specific surface area in a range of about 100-400 $m^2/g$; an average pore diameter in a range of about 7.0-15.0 nm; and a pore volume of less than 600 nm diameter pores in a range of about 0.4-1.0 ml/g.

13. The hydrotreating catalyst of claim 1, wherein the post-framework modified USY zeolite in the hydrotreating catalyst has: unit cell dimensions (UD) in a range of about 2.425-2.450 nm; a specific surface area in a range of about 600-900 $m^2/g$; a pore volume of about 0.3-0.75 ml/g; and wherein the post-framework modified USY zeolite includes $SiO_2$ and $Al_2O_3$ at a molar ratio $SiO_2/Al_2O_3$ in a range of about 5-100.

14. The hydrotreating catalyst of claim 1,
wherein the post-framework modified USY zeolite comprise titanium and zirconium substituting aluminum atoms constituting a zeolite framework of the USY zeolite, wherein the post-framework modified USY zeolite is substituted with about 0.1-5.0 weight % zirconium atoms, and about 0.1-5.0 weight % titanium atoms, calculated on an oxide basis, and wherein the post-framework modified USY zeolite comprises about 0.01-30 weight % of the total mass of said hydrotreating catalyst; and
wherein the one or more hydrotreating metal components comprise 20-30 weight % $MoS_2$ and 5-10 weight % an additional hydrotreating metal component comprising Co, Ni, oxides of Co, oxides of Ni, sulfides of Co or sulfides of Ni, of the total mass of said hydrotreating catalyst.

15. A method for hydrotreating hydrocarbon oil, comprising: hydrotreating hydrocarbon oil with the hydrotreating catalyst according to claim 1.

16. The method for hydrotreating hydrocarbon oil according to claim 15, wherein the hydrotreating comprises loading a flow reactor with the hydrotreating catalyst, wherein the flow reactor is selected from the group consisting of a stirred tank, an ebullient bed reactor, a baffled slurry tank, a fixed bed reactor, a rotating tubular reactor and a slurry-bed reactor.

17. The method for hydrotreating hydrocarbon oil according to claim 15, further comprising: filling a hydrotreating apparatus which is a flow reactor with the hydrotreating catalyst; and treating a hydrocarbon oil comprising middle distillates in the presence of hydrogen at a reactor temperature in a range of from about 270-430° C.; a hydrogen partial pressure in a range of from about 30-120 barg; a hydrogen gas feed rate of up to about 1000 standard liters per liter of hydrocarbon feed; and a liquid hourly space velocity, on a fresh feed volumetric rate relative to the volume of the hydrotreating catalyst, in a range of from about 0.1-10.0 $h^{-1}$.

18. The method for hydrotreating hydrocarbon oil according to claim 15, wherein the hydrocarbon oil comprises one or more of a) straight run middle distillates; b) one or more middle distillate fractions from hydroprocessing zones consisting of hydroprocessing of vacuum gas oil, deasphalted oil (DAO) obtained from a solvent deasphalting process or demetallized oil, coker gas oil obtained from a coker process, cycle oil obtained from a fluid catalytic cracking (FCC) process and gas oil obtained from a visbreaking process; c) light cycle oil obtained from a FCC process; d) light coker gas oil obtained from a coker process; e) light visbreaking gas oil obtained from a visbreaking process; f) plastic pyrolysis oils and g) bio-mass derived oils.

* * * * *